US006757691B1

(12) United States Patent
Welsh et al.

(10) Patent No.: US 6,757,691 B1
(45) Date of Patent: Jun. 29, 2004

(54) PREDICTING CONTENT CHOICES BY SEARCHING A PROFILE DATABASE

(75) Inventors: Patrick Welsh, Silver Spring, MD (US); George D. Escobar, Purcellville, VA (US)

(73) Assignee: America Online, Inc., Dulles, VA (US)

( * ) Notice: Subject to any disclaimer, the term of this patent is extended or adjusted under 35 U.S.C. 154(b) by 0 days.

(21) Appl. No.: 09/436,703

(22) Filed: Nov. 9, 1999

(51) Int. Cl.$^7$ .............................................. G06F 17/00
(52) U.S. Cl. .................................................. 707/104.1
(58) Field of Search ............................... 707/104.1, 10, 707/5, 200, 4, 100; 705/10, 26, 27; 709/218; 725/46; 345/721

(56) References Cited

U.S. PATENT DOCUMENTS

| | | | |
|---|---|---|---|
| 5,539,822 A | 7/1996 | Lett | 380/211 |
| 5,696,965 A * | 12/1997 | Derick | 707/10 |
| 5,710,884 A * | 1/1998 | Derick | 709/217 |
| 5,717,923 A * | 2/1998 | Dedrick | 707/102 |
| 5,758,257 A | 5/1998 | Herz et al. | 725/116 |
| 5,789,785 A * | 8/1998 | Ravanelli et al. | 257/361 |
| 5,801,747 A | 9/1998 | Bedard | 725/46 |
| 5,848,396 A * | 12/1998 | Gerace | 705/10 |
| 5,961,603 A | 10/1999 | Kunkel et al. | 709/229 |
| 5,973,683 A | 10/1999 | Cragun et al. | 345/719 |
| 5,991,735 A | 11/1999 | Gerace | 705/10 |
| 6,020,883 A | 2/2000 | Herz et al. | 345/721 |
| 6,061,056 A | 5/2000 | Menard et al. | 345/704 |
| 6,088,722 A * | 7/2000 | Herz et al. | 709/217 |
| 6,133,909 A | 10/2000 | Schein et al. | 345/721 |
| 6,163,316 A * | 12/2000 | Killian | 345/721 |
| 6,169,989 B1 * | 1/2001 | Eichstaedt et al. | 707/100 |
| 6,172,677 B1 | 1/2001 | Stautner et al. | 345/716 |
| 6,185,614 B1 * | 2/2001 | Cuomo et al. | 709/224 |

FOREIGN PATENT DOCUMENTS

EP          0854645 A2          7/1998

OTHER PUBLICATIONS

New WebTV–based Internet Receiver FAQ, http://developer.webtv.net/itv/2.3–2.3.5/main.htm, pp. 1–4, Jun. 23, 1999.
New WebTV–based Internet Receiver FAQ, http://developer.webtv.net/itv/2.2.2./main.htm, pp. 1–6, Jun. 9, 1999.
Introduction to WebTV, http://developer.webtv.net/design/whydev/whydev.htm, pp. 1–2, May 13, 1999.
Interactive TV Link Checksum Tool, http://developer.webtv.net/itv/tvlink/main.htm, pp. 1–2, May 12, 1999.
Interactive TV Examples, http://developer.webtv.net/itv/examples/demo1/main.htm, pp. 1–4, Jun. 2, 1999.
Displaying TV in Web Pages, http://developer.webtv.net/itv/embedtv/main.htm, pp. 1–3, Jun. 9, 1999.
What is Interactive TV?, http://developer.webtv.net/itv/whatis/main.htm, pp. 1–5, Jun. 9, 1999.
Interactive TV Examples, http://developer.webtv.net/itv/examples/main.htm, p. 1, Jun. 9, 1999.
Interactive TV on WebTV and Windows 98, http://developer.webtv.net/itv/win98/main.htm, pp. 1–2, May 12, 1999.
Interactive TV Links, http://developer.webtv.net/itv/links/main.htm, pp. 1–7, Jun. 9, 1999.
WebTV Products, http://www.webtv.net/products/index.html, p. 1, by WebTV Networks, Inc., before Nov. 9, 1999.
WebTV—Plus, http://www.webtv.net/products/plus/index.html; pp. 1–2, by WebTV Networks, Inc., before Nov. 9, 1999.
WebTV—Plus Features, http://www.webtv.net/products/plus/wantmore.html, pp. 1–2, by WebTV Networks, Inc., before Nov. 9, 1999.

(List continued on next page.)

*Primary Examiner*—Greta Robinson
(74) *Attorney, Agent, or Firm*—Fish & Richardson P.C.

(57) ABSTRACT

Managing a user's content choices includes predicting one or more content choices that are likely to be of interest to a user based on a degree of matching between a psychographic profile for the user and available content. The predicted content choices are then presented to the user.

48 Claims, 18 Drawing Sheets

OTHER PUBLICATIONS

WebTV—Plus Features, http://www.webtv.net/products/plus/wantmore2.html, p. 1, by WebTV Networks, Inc., before Nov. 9, 1999.

New WebTV–based Internet Receiver FAQ, http://developer.webtv.net/itv/2.3–2.3.5/main.htm, pp. 1–4, Jun. 23, 1999.

New WebTV–based Internet Receiver FAQ, http://developer.webtv.net/itv/2.2.2./main.htm, pp. 1–6, Jun. 9, 1999.

Introduction to WebTV, http://developer.webtv.net/design/whydev/whydev.htm, pp. 1–2, May 13, 1999.

Interactive TV Link Checksum Tool, http://developer.webtv.net/itv/tvlink/main.htm, pp. 1–2, May 12, 1999.

Displaying TV in Web Pages, http://developer.webtv.net/itv/embedtv/main.htm, pp. 1–3, Jun. 9, 1999.

What is Interactive TV?, http://developer.webtv.net/itv/whatis/main.htm, pp. 1–5, Jun. 9, 1999.

Interactive TV Examples, http://developer.webtv.net/itv/examples/main.htm, p. 1, Jun. 9, 1999.

Interactive TV on WebTV and Windows 98, http://developer.webtv.net/itv/win98/main.htm, pp. 1–2, May 12, 1999.

Interactive TV Links, http://developer.webtv.net/itv/links/main.htm, pp. 1–7, Jun. 9, 1999.

WebTV Products, http://www.webtv.net/products/index.html, p. 1, by WebTV Networks, Inc., before Nov. 9, 1999.

WebTV—Plus, http://www.webtv.net/products/plus/index.html; pp. 1–2, by WebTV Networks, Inc., before Nov. 9, 1999.

WebTV—Plus Features, http://www.webtv.net/products/plus/wantmore.html, pp. 1–2, by WebTV Networks, Inc., before Nov. 9, 1999.

WebTV—Plus Features, http://www.webtv.net/products/plus/wantmore2.html, p. 1, by WebTV Networks, Inc., before Nov. 9, 1999.

WebTV—Plus Features, http://www.webtv.net/products/plus/wantmore3.html, p. 1, by WebTV Networks, Inc., before Nov. 9, 1999.

WebTV Classic—Features, http://www.webtv.net/products/classic/wantmore.html, p. 1, by WebTV Networks, Inc., before Nov. 9, 1999.

WebTV Classic, http://www.webtv.net/products/classic/index.html, p. 1, by WebTV Networks, Inc., before Nov.9, 1999.

WebTV Classic—Features, http://www.webtv.net/products/classic/wantmore2.html, pp. 1–2, by WebTV Networks, Inc., before Nov. 9, 1999.

WEBTV—Questions and Answers, http://www.webtv.net/products/questions/index.html,, pp. 1–9, by WebTV Networks, Inc., before Nov. 9, 1999.

"MOVIE CRITIC", Like Minds, Inc., http://www.moviecritic.com/faq.html, pp. 1–5; http://www.moviecritic.com/cgi–bin . . . =–q2rpaB–UTeo4I&rg=Vda&genre.exc=4, p. 1 http://www.moviecritic.com/cgi–bin . . . –UTeo4I&rg=Zda&genre=1&genre.exc=4, p. 1; http://www.moviecritic.com/cgi–bin . . . =Iperl&genre.inc=0&genre=1&x=31&y=6, p. 1; http://www.andromedia.com/products likeminds/index.Html, p. 1, before Nov. 9, 1999.

"likeminds 2.2", Andromedia, Inc., http://www.andromedia.com/products/likeminds/index.html, p. 1, before Nov. 9, 1999.

"The Marketel MK II Predictive Dialer", MarkeTel Systems; http://predictivedialers.com/main2.htm, p. 1: http://predictivedialers.com/whatis.htm, p. 1; http://predictivedialers.com/whatis5.htm, p. 1, before Nov. 9, 1999.

"PointCast Network Quick Look", Pointcast, Inc.: http://www.pointcast.com/products/pcn/index.html?svcidx, pp. 1–3, before Nov. 9, 1999.

"How PointCast Works", PointCast, Inc., http://www.pointcast.com/products/pcn/hwork.html?pcnidxbotnav, pp. 1–3, before Nov. 9, 1999.

"What's on PointCast: Channels and News Sources", PointCast, Inc., http://www.pointcast.com/products/pcn/whtson.html?pcnhwork, pp. 1–2, before Nov. 9, 1999.

"Forrester Research", Forrester Research Inc., May 12, 1999; http://www.forrester.com/, p. 1.

"Applying Technographics", by Rob Rubin et al., Apr. 1999, http://www.forrester.com/ER/Marketing/0,1503,84,00.html, pp. 1–8.

"Frequently Asked Questions", TiVo, May 12, 1999, wysiwyg://200/http://www.tivo.com/what/faq_sub.html#q01, pp. 1–8.

"CyberAtlas: Professional: Doctor's Net use Keeps Increasing", internet.com LLC, May 6, 1999, http://www.cyberatlas.com/market/professional/physician.html, pp. 1–2.

"CyberAtlas: Retailing: Garden and Gifts Attract New Buyers", internet.com LLC, May 3, 1999, http://www.cyberatlas.com/market/retailing/new.html, pp. 1–2.

"About Media Metrix", http://www.mediametrix.com/About/About.html, pp. 1–2, before Nov. 9, 1999.

"Media Metrix Press Room: Media Metrix Releases the Top 50 Digital Media/Web Property and Web Site rankings for Combined Home/work usage", Apr. 21, 1999, http://www.mediametrix.com/PressRoom/Press_Releases/04_21_99.html, pp. 1–5.

WebTV—Plus Features, http://www.webtv.net/products/plus/wantmore3.html, p. 1, by WebTV Networks, Inc., before Nov. 9, 1999.

WebTV Classic—Features, http://www.webtv.net/products/classic/wantmore.html, p. 1, by WebTV Networks, Inc., before Nov. 9, 1999.

WebTV Classic, http://www.webtv.net/products/classic/index.html, p. 1, by WebTV Networks, Inc., before Nov.9, 1999.

WebTV Classic—Features, http://www.webtv.net/products/classic/wantmore2.html, pp. 1–2, by WebTV Networks, Inc., before Nov. 9, 1999.

WEBTV—Questions and Answers, http://www.webtv.net/products/questions/index.html,, pp. 1–9, by WebTV Networks, Inc., before Nov. 9, 1999.

"MOVIE CRITIC", Like Minds, Inc., http://www.moviecritic.com/faq.html, pp. 1–5; http://www.moviecritic.com/cgi–bin . . . =–q2rpaB–UTeo4I&rg=Vda&genre.exc=4, p. 1 http://www.moviecritic.com/cgi–bin . . . –UTeo4I&rg=Zda&genre=1&genre.exc=4, p. 1; http://www.moviecritic.com/cgi–bin . . . =Iperl&genre.inc=0&genre=1&x=31&y=6, p. 1; http://www.andromedia.com/products likeminds/index.Html, p. 1, before Nov. 9, 1999.

"likeminds 2.2", Andromedia, Inc., http://www.andromedia.com/products/likeminds/index.html, p. 1, before Nov. 9, 1999.

"The Marketel MK II Predictive Dialer", MarkeTel Systems; http://predictivedialers.com/main2.htm, p. 1: http://predictivedialers.com/whatis.htm, p. 1; http://predictivedialers.com/whatis5.htm, p. 1, before Nov. 9, 1999.

"How PointCast Works", PointCast, Inc., http://www.pointcast.com/products/pcn/hwork.html?pcnidxbotnav, pp. 1–3, before Nov. 9, 1999.

"What's on PointCast: Channels and News Sources", PointCast, Inc., http://www.pointcast.com/products/pcn/whtson.html?pcnhwork, pp. 1–2, before Nov. 9, 1999.

"Forrester Research", Forrester Research Inc., May 12, 1999; http://www.forrester.com/, p. 1.

"Applying Technographics", by Rob Rubin et al., Apr. 1999, http://www.forrester.com/ER/Marketing/0,1503,84,00.html, pp. 1–8.

"Frequently Asked Questions", TiVo, May 12, 1999, wysiwyg://200/http://www.tivo.com/what/faq_sub.html#q01, pp. 1–8.

"CyberAtlas: Professional: Doctor's Net use Keeps Increasing", internet.com LLC, May 6, 1999, http://www.cyberatlas.com/market/professional/physician.html, pp. 1–2.

"CyberAtlas: Retailing: Garden and Gifts Attract New Buyers", internet.com LLC, May 3, 1999, http://www.cyberatlas.com/market/retailing/new.html, pp. 1–2.

"About Media Metrix", http://www.mediametrix.com/About/About.html, pp. 1–2, before Nov. 9, 1999.

"Media Metrix Press Room: Media Metrix Releases the Top 50 Digital Media/Web Property and Web Site rankings for Combined Home/work usage", Apr. 21, 1999, http://www.mediametrix.com/PressRoom/Press_Releases/04_21_99.html, pp. 1–5.

"Profiles of Mafalda Fans", by Roland Soong, Apr. 20, 1998, http://www.zonalatina.com/Zldata35.htm, p. 1.

* cited by examiner

Fig. 5

| | M | T | W | H | F | S | S |
|---|---|---|---|---|---|---|---|
| May 5, 1999 | 8:30 P | | | 9:00 P | | 9:30 P | |
| ESPN | ND vs. OSU Baseball | | | | | Gameday | |
| DISC | NOVA | | | News | | Special | |
| BET | Video Music Awards Show | | | | | | |
| PBS | Masterpiece Theater | | | | | Antiques Roadshow | |
| 4 | Suddenly Susan | | | Movie | | Dateline | |
| 9 | Spring Fashions | | | | | Special Sales | |
| HSN | | | | | | | |
| TWC | Natural Disasters | | | Best of TWC Commercials | | | |
| 8:11 P | May 4, 1999 | | CNN | | Channel 32 | | Tuesday |

CNN

MovieCritic SUPER-RATER  ← to Lobby

Turn on Rate O' Matic

To rate a movie, use the pop-up menu next to the title. Clicking the title itself shows its Internet Movie Database listing.

If you already know of some movies you'd like to rate, you can type their names in the box below (One movie title per line please). The movies you choose will appear in the list after you scroll down and click on "Submit and Get More Movies".

| Movie | Rating |
|---|---|
| THE MISSION (1986) | ********** Really liked it |
| SLEEPERS | Haven't seen it |
| YOUR FRIENDS AND NEIGHBORS | Haven't seen it |
| HEAVY | Haven't seen it |
| BILL & TED'S BOGUS JOURNEY | ******* Liked it |
| HOOK (1991) | ** |
| TWINS | Haven't seen it |
| BLACK RAIN (MICHAEL DOUGLAS | ********* |
| TRADING PLACES | Can't remember it |
| A PERFECT MURDER (1998) | **** Tolerated it |

SUBMIT AND GET MORE MOVIES

Copyright © LikeMinds, Inc., 1996-1998. ALL RIGHTS RESERVED
http://www.moviecritic.com
Send comments and questions to mcmgr@moviecritic.com

Fig. 6A

 BEST BETS 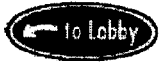

Here are the Movie Critic's highest recommendations for you!
Click on a movie's title to rate it or to find out
how likely you are to enjoy it.

SHOW ME BEST BETS FOR

Any Genre ▼   GO!

THE CELEBRATION

CENTRAL STATION

THE MATRIX (1999)

UN AIR DE FAMILLE

LOCK, STOCK & TWO SMOKING BARRELS

GODS AND MONSTERS

MADADAYO

LIFE IS BEAUTIFUL (1997)

UNMADE BEDS (1997)

RUSHMORE

ENEMY OF THE STATE (1998)

CELEBRITY (1998)

THE FACULTY (1998)

OCTOBER SKY

PAYBACK (1999)

CRUEL INTENTIONS

WESTERN (1997)

A SIMPLE PLAN

THE PRINCE OF EGYPT

A CIVIL ACTION

GET MORE MOVIES

Copyright © LikeMinds, Inc., 1996-1998. ALL RIGHTS RESERVED
http://www.moviecritic.com
Send comments and questions to mcmgr@moviecritic.com

Fig. 6B

| Criterion | Description |
|---|---|
| Relevancy | Is Data What User Is Looking For? |
| Parallax | Is There A Different View Of Data? |
| Registry | What Is Data Affiliated With? |
| Selection | How Was Data Collected? |
| Criticism | Is There Another Piece Of Data Critical Of Current Data? |
| Construction | What Is Condition, Structure, Or Security Of Data? |
| Position | Where Is User And Where Is User Going? |

Fig. 15

PREDICTING CONTENT CHOICES BY SEARCHING A PROFILE DATABASE

TECHNICAL FIELD

This application relates to managing content choices, for example, such as in an electronic programming guide used in a television (TV) environment.

BACKGROUND

A computer system 100 illustrated in FIG. 1 represents a typical hardware setup for executing software that allows a user to perform tasks such as communicating with other computer users, accessing various computer resources, and viewing, creating, or otherwise manipulating electronic content—that is, any combination of text, images, movies, music or other sounds, animations, 3D virtual worlds, and links to other objects. The system includes various input/output (I/O) devices (mouse 102, keyboard 104, display 106) and a general purpose computer 108 having a central processor unit (CPU) 110, an I/O unit 112 and a memory 114 that stores data and various programs such as an operating system 116, and one or more application programs 118.

The computer system 100 also typically includes some sort of communications card or device 120 (for example, a modem or network adapter) for exchanging data with a network 122 via a communications link 124 (for example, a telephone line). A content provider provides access to network content in addition to various services associated with the content. Examples of content providers include Internet service providers (ISPs) 126 such as AT&T WorldNet and UUNet or online service providers (OSPs) 128 such as America Online and Compuserve.

As shown in FIG. 2, a user of the computer system 100 can access electronic content or other resources either stored locally at the user's own client system 202 (for example, a personal or laptop computer) or remotely at one or more server systems 200. An example of a server system is a host computer that provides subscribers with online computer services such as e-mail, e-commerce, chat rooms, Internet access, electronic newspapers and magazines, etc. Users of a host computer's online services typically communicate with one or more central server systems 200 through client software executing on their respective client systems 202.

In practice, a server system 200 typically will not be a single monolithic entity but rather will be a network of interconnected server computers, possibly physically dispersed from each other, each dedicated to its own set of duties and/or to a particular geographical region. In such a case, the individual servers are interconnected by a network of communication links, in known fashion. One such server system is "America Online 4.0" from America Online, Incorporated of Virginia.

A "browser" is an example of client software that enables users to access and view electronic content stored either locally or remotely, such as in a network environment (local area network (LAN), intranet, Internet). A browser typically is used for displaying documents described in Hyper-Text Markup Language (HTML) and stored on servers connected to a network such as the Internet.

A user instructs a browser to access an HTML document, or web page, by specifying a network address—or Uniform Resource Locator (URL)—at which a desired document resides. In response, the browser contacts the corresponding server hosting the requested web page, retrieves the one or more files that make up the web page, and then displays the web page in a window on the user's computer screen.

FIG. 3 is a screen shot of a browser application 300 (Internet Explorer) displaying a typical HTML document, or web page 302. As shown therein, a single web page may be composed of several different files potentially of different data types 304 (for example, text, images, virtual worlds, sounds, or movies). In addition, a web page can include links 306, or pointers, to other resources (for example, web pages or individual files) available on the network. Each link has an associated URL pointing to a location on the network. When a user clicks on, or otherwise selects a displayed link, the browser automatically will retrieve the web page or other resource corresponding to the link's associated URL and display it to, or execute if for, the user.

Referring to FIG. 4, a "web-based TV" system 400 has been developed that makes dual usage of TV sets 402. That is, a user of web-based TV either can watch TV or view web pages and otherwise "surf" the Internet. In this regard, a special purpose computer 404, referred to as a "set top device," has been developed and used in connection with standard TV sets 402 for viewing web pages on the Internet. The set top device 404 essentially has the same basic components as the general purpose computer 108 illustrated in FIG. 1 (including, for example, CPU 110 and memory 114), except that it also includes a TV tuner 406 for receiving broadcast and/or cable TV signals 407. The set top device 404 thus can selectively display two different sources of content (TV programming received by TV tuner 406 and web or network content received by communications device 120) on the TV monitor 402 connected to the set top device 404.

Accessories may be added to the web-based TV system 400, for example, a wireless keyboard 408 similar to keyboard 104 but with specialized keys that are designed for use in the web-based TV system 400 to make Internet access and surfing easier. Additionally, a wireless remote control 410 may be used to control the set top device 404 and to facilitate channel surfing and web-based TV connections via various buttons 412 that may be specialized for the web-based TV system 400.

An example of an existing web-based TV system 400 is WebTV by Microsoft. Information about the WebTV product may be found at WebTV's web page at www.webtv.net under the Products section at www.webtv.net/products.

Typically, to facilitate viewing selection, TV systems, both web-based and conventional, may employ an electronic programming guide (EPG) 500 such as the one shown in FIG. 5. The EPG 500 usually is displayed on a dedicated channel and occupies the majority of the TV screen 504. Once a user selects a date 506 and day of the week 508, the user may scroll (shown as arrows 510) through channels 502 and time slots 512 to see what viewing choices are available. A status bar 514 may be displayed on the EPG 500 that gives current TV settings and time. The EPG 500 may display either a traditional TV channel (such as CNN) in a miniature viewing area 516 or a special TV channel (such as PAY-PER-VIEW previews) associated with the EPG 500.

Due to an increase in available bandwidth in communications signals such as telephone and cable lines, the number of content choices available to a user or subscriber of a web-based TV system 400 has grown dramatically in recent years. Accordingly, the present inventors recognized that it would be desirable to provide users with an intelligent mechanism for managing and presenting their available content choices. The present inventors also recognized that an intelligent mechanism would account for a user's limited investment time and a TV screen's limited space or "real estate."

SUMMARY

Various implementations may include one or more of the following features.

In one general aspect, a computer-implemented method manages a user's content choices. The method includes predicting one or more content choices that are likely to be of interest to a user based on a degree of matching between a psychographic profile for the user and available content. The predicted content choices are then presented to the user.

Embodiments may include one or more of the following features.

The method may include receiving an identifier from a content provider, the identifier indicating the psychographic profile for the user. The method may further include searching a profile database to determine the psychographic profile indicated by the identifier.

The method may also include monitoring user activities to continually refine the user's psychographic profile. Monitoring may include monitoring one or more of a user's inputs, the inputs including keystrokes, mouse clicks, remote control button activations, or any combination thereof. Monitoring may also include detecting patterns in the user's inputs, and encoding and storing the detected patterns in an archive of the user's inputs.

User activities may include a user's visit to a content choice, a user's purchase of a product, or a user's history of content selections. Alternatively, user activities may include a user's response to one or more questions or prompts.

The psychographic profile may be based on a user's behavior. Furthermore, the user's behavior may include browsing and purchasing patterns. Alternatively, the psychographic profile may be based on other users' behavior. Other users' behavior may include demographic or affinity patterns of users.

The degree of matching may be based on external conditions. Additionally, the external conditions may include weather conditions, temporal conditions or user location conditions. Likewise, the degree of matching may be based on expert choices. The degree of matching may be based on premium content provider choices. And lastly, the degree of matching may be based on ranked lists of content choices.

Predicting one or more content choices may include randomly selecting one or more content choices.

The matching may be based on probability-weighted mappings from a psychographic profile to one or more categories of content. A content category may include a variety of experiences, resources, and capabilities of content choices that fall within one or more of the content categories. Furthermore, content categorization may include accessing and classifying a substantial plurality of content choices.

Content categorization may include analyzing data within content to determine relationships among content data. Data relationships may include relevancy that indicates whether the data is what the user is searching for. Data relationships also may include parallax that indicates a different view of the same data exists. A registry data relationship may be included which indicates an object with which the data is affiliated. Data relationships may include selection that indicates how the data was collected. A criticism data relationship may be included, the criticism relationship indicating if another piece of data exists that is critical of the current data. Data relationships may further include construction that indicates a structure of the data. Moreover, data relationships may include position that indicates a realtime position and direction of the user.

Content categorization may include associating one or more users' actions with other users' actions.

The content managing method may also include determining a user's psychographic profile by determining a configuration of a user's computer system.

Presenting the predicted content choices may include outputting the content choices to a content provider. Outputting the content choices to the content provider may include causing the content provider to display content choices in a navigatable electronic programming guide.

In another general aspect, a computer-implemented method of managing a user's content choices includes receiving data descriptive of a user's patterns. A psychographic profile is built for the user based on the received pattern data. The method also includes receiving data relating to content choices. Content categories associated with the received content choices are determined. Furthermore, the user's psychographic profile is predictively mapped to the determined content categories. Based on the predictive mapping, the method selectively provides content choices to the user.

Embodiments may include one or more of the following. The environment may include a special purpose computer.

A user's patterns may include viewing patterns, or purchasing patterns. The user's patterns may be based on a user's answers to questions, or a user's previous behavior.

The psychographic profile may be based on external events. Likewise, the psychographic profile may be based on content choices of one or more users in a region, content choices of one or more users during an interval of time, or content choices of one or more users relative to weather pattens.

The content managing method may also include assigning an alpha-numeric identifier to a psychographic profile. Content categories may include one or more content choices that exhibit similar attributes. A content choice may be associated with one or more content categories.

In another general aspect, a content choice prediction architecture includes a psychographic profile defining a user's content preferences, and two or more content categories. The architecture also includes a content manager for predicting content choices likely to be of interest to the user based on a degree of matching between the user's psychographic profile and one or more of the content categories.

Embodiments may include one or more of the following. The user's content preferences may include patterns of content viewing and purchasing.

Each content category may include one or more content choices that are distinguished from other content choices. The distinguishing may be based on resource available at and capabilities of the content choices.

The content manager may include a human that determines the degree of matching between the user's psychographic profile and one or more content categories. The human may populate and maintain a meta-rules database, associated with the content manager, with meta-rules that instruct the content manager how to monitor changing content and psychographic profiles to determine degrees of matching between a psychographic profile and one or more content choices.

The content manager may include a processor that automatically determines the degree of matching between the user's psychographic profile and one or more content categories. The content manager may include a neural network that continually adjusts its prediction based on changes in psychographic profiles, content choices, and relationships between content choices.

In another general aspect, a computer-implemented method of installing content choice prediction architecture includes manually building a predictive content system. The manual building includes evaluating raw patterns for users, and determining new psychographic profiles based on the raw pattern evaluation. The manual building further includes browsing content choices to select content attributes, and categorizing content choices based on the browsing. The manual building also include mapping psychographic profiles with content categories, and codifying the mapping in a map database. The architecture-installing method includes developing the predictive content system into a self-teaching system that relies on a predictive content manager that automatically predicts one or more content choices that are likely to be of interest to a user based on the mapping.

Embodiments may include one or more of the following. Determining new psychographic profiles may include determining whether the raw user patterns constitute new patterns for that user, and if so, storing a new psychographic profile identifier in an identifier database.

Determining new psychographic profiles may include determining whether the raw user patterns qualify as new patterns, and if so, updating an existing or storing a new psychographic profile in a profile database.

Developing may include populating a meta-rules database, associated with the predictive content system, with meta-rules that dictate to the predictive content system how to scan through content choices and raw user patterns to amend the codified mapping.

The architecture-installing method may also include updating an existing or storing a new content category based on the browsing.

The systems and techniques described here may provide one or more of the following advantages.

An intelligent content managing system provides users with a mechanism for managing and presenting their available content choices. In a broadband environment that uses, for example, Digital Subscriber Line (DSL) technology, the intelligent content managing system is especially useful. When applied to a web-based TV environment, such an intelligent content manager provides viewers with content choices (for example, TV channels, web pages, etc.) that are likely to be of interest, while minimizing the amount of time and effort spent by the users in locating desirable content. Moreover, the content choices provided to each viewer are specifically tailored to that user's likes and dislikes. Because the user plays a relatively passive role in the content management, the user is able to spend less time searching for desirable content and more time enjoying the provided content choices.

The details of one or more embodiments are set forth in the accompanying drawings and the description below. Other features, objects, and advantages will be apparent from the description and drawings, and from the claims.

DRAWING DESCRIPTIONS

FIG. 5 shows an electronic programming guide displayed on a TV screen that may be used on the web-based TV system of FIG. 4.

FIGS. 6A and 6B show an example of a content manager that helps a user predict future content likes and dislikes.

FIG. 15 is a table showing possible data relationships that may be used by the predictive content system to find new user patterns and/or content choices.

Like reference numbers and designations in the various drawings indicate like elements.

DETAILED DESCRIPTION

An electronic programming guide is one example of a manager for displaying viewing channel choices in a TV system. More generally, a "content" manager may be used in content systems to manage and present the content choices to facilitate the user's involvement. Many different content applications are facilitated by a content manager. A content manager seeks to maximize a time that a user spends interacting with content and to minimize a time that a user spends searching for content.

For example, a content manager may filter content before presenting it to a user, thus minimizing the time a user spends searching through available content choices. In brief, a content filtering system provides a user with content (for example, news stories) from selected channels and sources by automatically delivering the content to the user's computer via the Internet at user-specified intervals (referred to as "push" delivery).

A content manager may provide content choices to a user after prompting the user to actively rank content choices. FIG. 6A, shows an example of a user-active filtering system that prompts the user to give individual ratings—both likes and dislikes—of the user's previously viewed movies. This system compares the user's movie ratings to the movie ratings of other movie raters who have similar tastes to the user.

Referring to FIG. 6B, the content filtering system then predicts in realtime which movies the user would enjoy, based on this collective "wisdom" of other like-minded raters. The more ratings the user can provide to the system, the likelihood that the suggested choices are accurate increases. As a result, users receive an incentive to spend time ranking previously-viewed movies.

Figure 7:
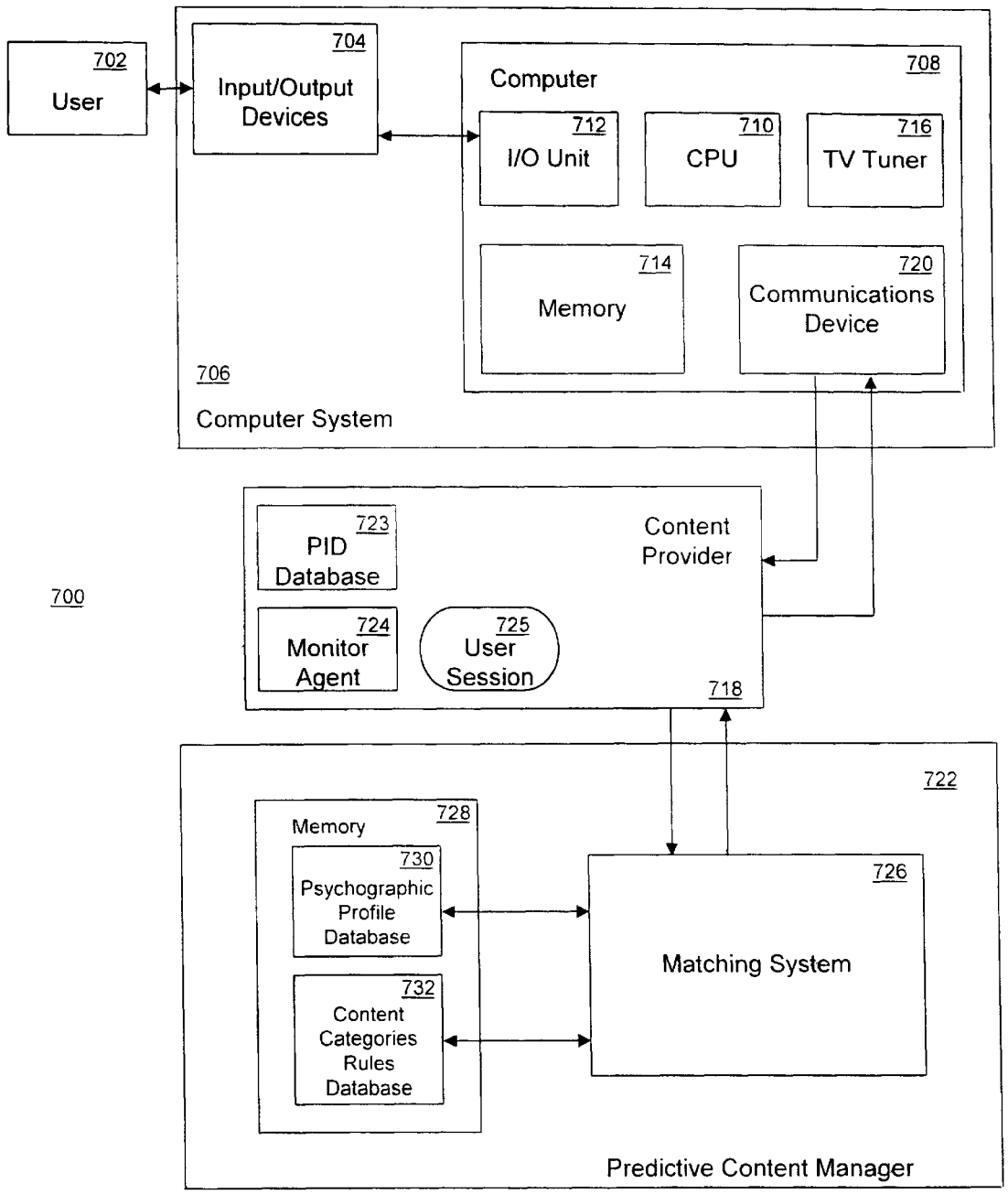
FIG. 7 is a block diagram of a predictive content system, a computer system, and a content provider.

Referring to FIG. 7, a predictive content system 700 may be used in any content-managing system (for example, a web-based TV system) to manage and present content choices to a user 702 through an input/output device 704 (for example, a display or TV monitor). The predictive content system 700 continually adjusts presented content choices to a user due to changes in content, changes in a particular user's actions, or changes in another user's actions.

Figure 8:
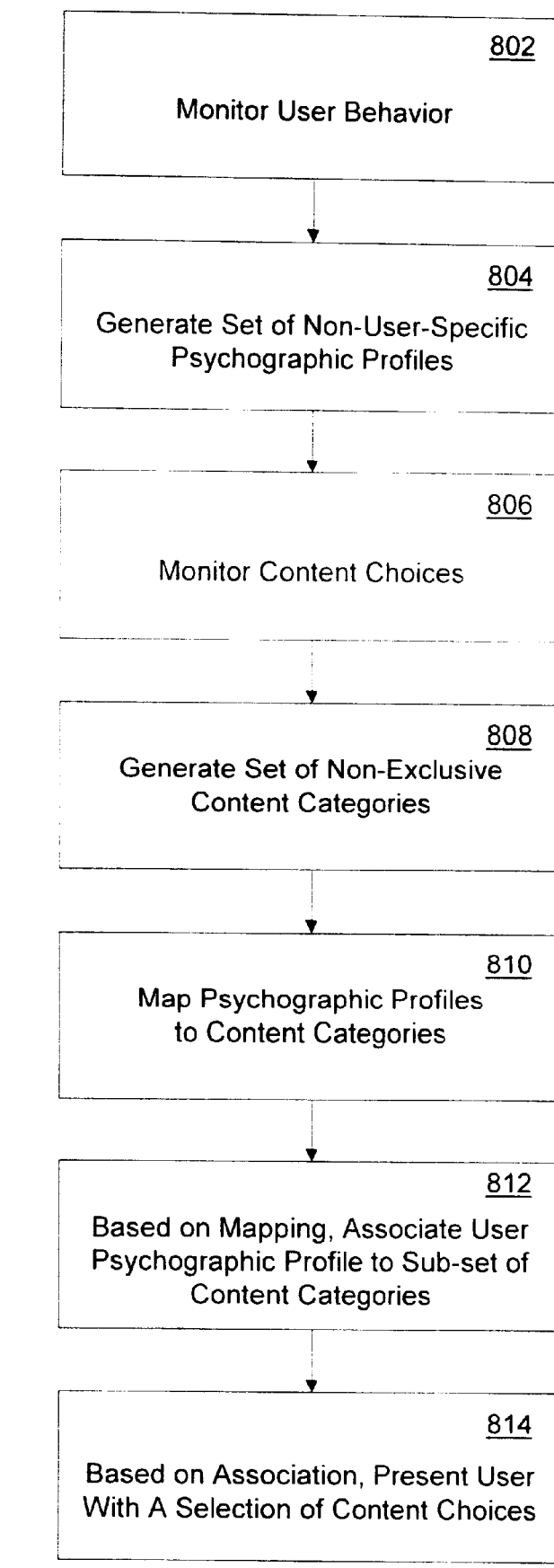
FIG. 8 is a flow chart of accessing content choices, predicting user-preferred content choices, and presenting the predicted choices to a user.

Referring to a flow chart 800 in FIG. 8, the predictive content system 700 generally performs a procedure 800 for managing and presenting content choices to the user. For clarity, reference is simultaneously made to a block diagram 900 in FIG. 9 during discussion of procedure 800. The predictive content system 700 monitors user viewing and purchasing patterns (step 802), and collects and stores all relevant data. User viewing and purchasing patterns may be monitored and then collected and stored using clickstream tagging. A clickstream is a stream of user keystrokes, mouse clicks, and/or remote control button activations. Users make many on-line decisions, buried in the clickstream, that together form patterns from which preferences and interests can be inferred. Typically, however, an entire user clickstream is not processed in raw form because the clickstream is too vast for computer processors. Therefore, clickstream tagging may be used to make it feasible to aggregate and refine psychographic profiles.

Clickstream tagging involves detecting patterns in the user clickstream, and encoding and storing the detected patterns in an archived version of the clickstream. The predictive content manager 722 performs clickstream tagging in a way that is processor-efficient, yet also yields sufficiently accurate user preferences for psychographic profiling. A few clickstream tagging techniques are described below.

XML (or extensible markup language), as a generalized meta-language for application program interfaces (APIs), may provide the best scheme by which to tag meaningful clickstream patterns and events. This scheme requires that the predictive content manager monitor the user clickstream either in realtime, or in discrete chunks of time when the user is offline. Then, the predictive content system makes decisions about what to tag in that clickstream before it is stored. The tagged version of a clickstream per unit time could then be fed to the portion of a predictive content system that aggregates and refines psychographic profiles.

One method of clickstream tagging involves buy-decision logging. In buy-decision logging, every user purchase of a product is, by definition, a weightable vote for that product. Purchase decisions can be XML-tagged in the archived form of the user clickstream.

The predictive content system could use a method called homepage tagging. During homepage tagging, the predictive content system tags the clickstream whenever the user changes his or her browser homepage. Weighting may depend, in part, on whether that homepage is the default homepage for the browser installation. In that case, user selection of that homepage does not necessarily represent a user decision, and it may not represent a user preference.

Another method of clickstream tagging involves Favorites/Bookmarks list tagging. In Favorites/Bookmark list tagging, any change a user makes to his or her favorites or bookmarks can be XML tagged in the clickstream.

The predictive content system may use a method called repeated-site-visit tagging. In repeated-site-visit tagging, the predictive content system assigns a preference weight to a site according to the number of visits a user makes to that site. Furthermore, another preference can be derived from the duration of the user's visit to that site. XML tags for visit number and visit duration can be inserted in the archived form of the clickstream.

Another method of clickstream tagging involves recommendation tagging. During recommendation tagging, whenever a user forwards the URL of a visited site to another person, preference weight tags can be inserted in the archived clickstreams of both the sender and the recipient. The recipient can further be weighted according to whether he or she then chooses to visit that site.

The predictive content system may use a method called plug-in tagging. During plug-in tagging, the predictive content system tags any event in which a user downloads and installs a browser plug-in.

Based on the relevant data that is collected and stored, the predictive content system 700 distributes user viewing and purchasing patterns into psychographic profiles 902 to generate a master set 904 of psychographic profiles (step 804). The psychographic profiles 902 are independent of particular users. That is, a psychographic profile does not identify a user, but rather identifies viewing and purchasing patterns that may be exhibited by any number of users. The predictive content system 700 also monitors available content choices (step 806). Based on the collected content data, the predictive content system 700 distributes content choices into non-exclusive categories 906 to generate a master set 908 of content categories (step 808). Categories are non-exclusive because there may exist a degree of overlap between content choices found in different content categories.

Figure 9:
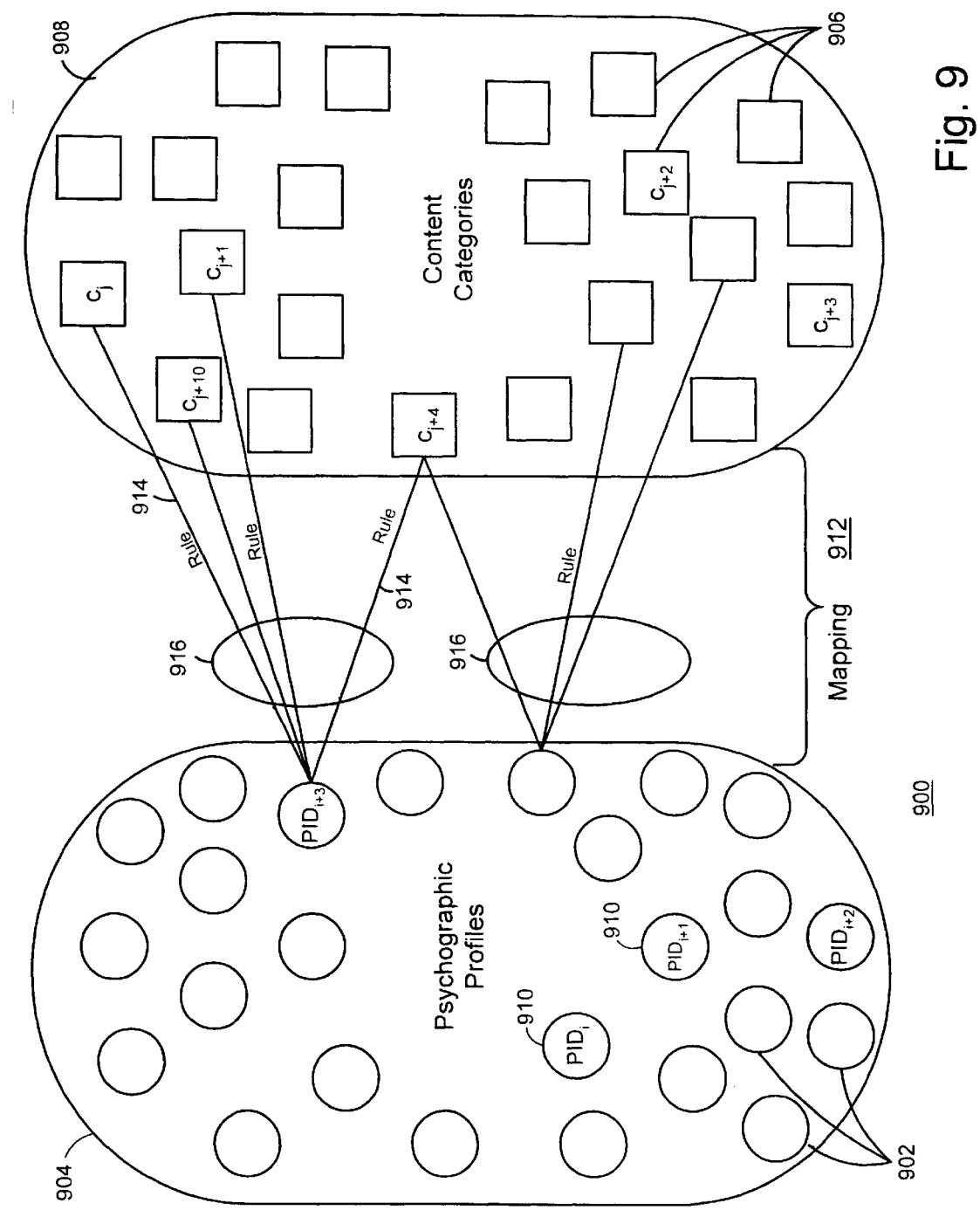
FIG. 9 is a block diagram showing a mapping between psychographic profiles and content choices.

Each content category describes a variety of experiences, resources, and capabilities of content choices that fall within that content category. Each psychographic profile describes a unique combination of user viewing and purchasing patterns that fall within that psychographic profile. A symbolic or numeric psychographic identifier (PID) may be associated or linked with a particular psychographic profile. In FIG. 9, the PID is represented as PIDI 910, where the i indexes each psychographic profile in the master set 904.

The predictive content system 700 evaluates and sorts the content category data and user psychographic profile data, and performs a mapping 912 (represented by lines 914 from the master set 904 of psychographic profiles to the master set 908 of content categories) of each psychographic profile 902 to one or more categories 906 of content choices (step 810). Each line 914 in the mapping 912 corresponds to a rule that maps or matches a particular psychographic profile to a specific content category. An example of a rule might be: If the psychographic profile includes "likes Disney movies"+ "likes animals"+"likes mountains" THEN recommend content="Disney movies-involving-multiple-animals-in-the-mountains."

Based on the mapping 912, the predictive content system 700 associates a user's psychographic profile to a subset (represented by circle 916 in FIG. 9) of content categories (step 812). Based on the association with the subset 916, the predictive content system 700 presents a selection of content choices to the user (step 814).

For example, in FIG. 9, the psychographic profile numerically represented by $PID_{i+3}$ is matched to content categories represented by $C_j$, $C_{j+1}$, $C_{j+10}$, and $C_{j+4}$ using corresponding rules. For a user with a psychographic profile having an identifier of $PID_{i+3}$, a selection of content choices that may be presented to the user includes the subset $\{CC_j, CC_{j+1}, CC_{j+10}, \text{ and } CC_{j+4}\}$ of content choices (CC) that fall within the content categories $C_j$, $C_{j+1}$, $C_{j+10}$, and $C_{j+4}$.

Psychographic profiles may be broad (for example, plumbers) or very narrow (for example, a small-business owner, do-it-yourselfer, late-night-shopper, and bargain-hunter). Therefore, there can be virtually any number of psychographic profiles 902. Similarly, content may be classified into broad categories (for example, books) or narrow categories (for example, purchasing-books, hunting-for-books, browsing-for-books, book-reviews, and book-chat-sessions).

A rule 914 may be, for example, a probability-weighted likely map between a psychographic profile 902 and a content category 906. For example, a psychographic ID of 26754 may correspond to a psychographic profile of a female that is the head of a household, likes Disney films The Little Mermaid and Beauty and the Beast, owns a sport utility vehicle, has an income of $101,000, and holds an M.D. as the highest level of education. Using the mapping 912, the predictive content system 700 matches one or more content categories that have greater probabilities of being of interest to the PID=26754 psychographic profile. Content categories having high probabilities for matching the profile in this example may include stress management, Disney films, how-to-invest-for-retirement, medical associations, and how-to-invest-for-children's-education. The rules would therefore match the PID 26754 to the above-mentioned content categories.

Figure 1:
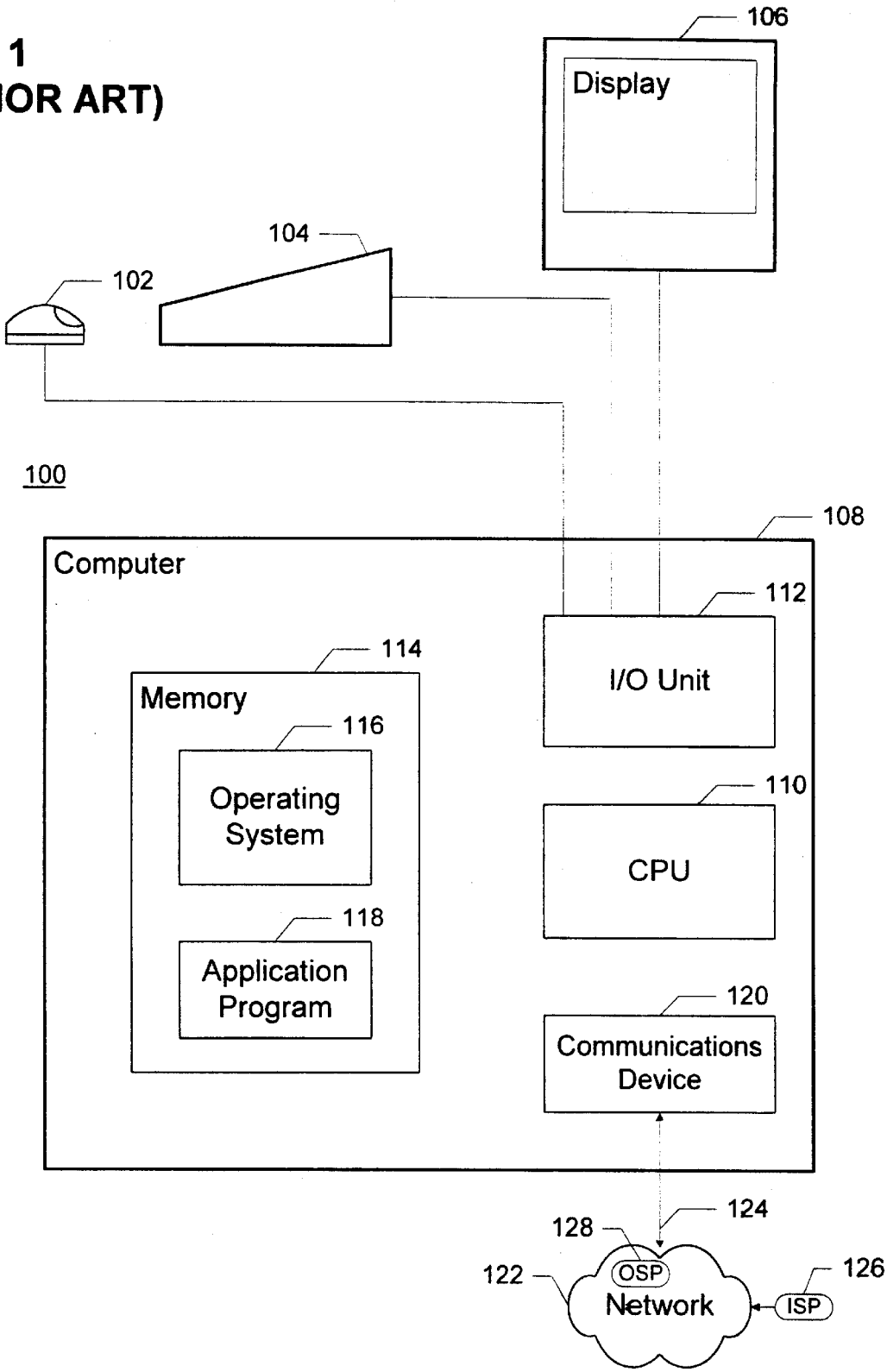
FIG. 1 is a block diagram of a computer system.
Figure 2:
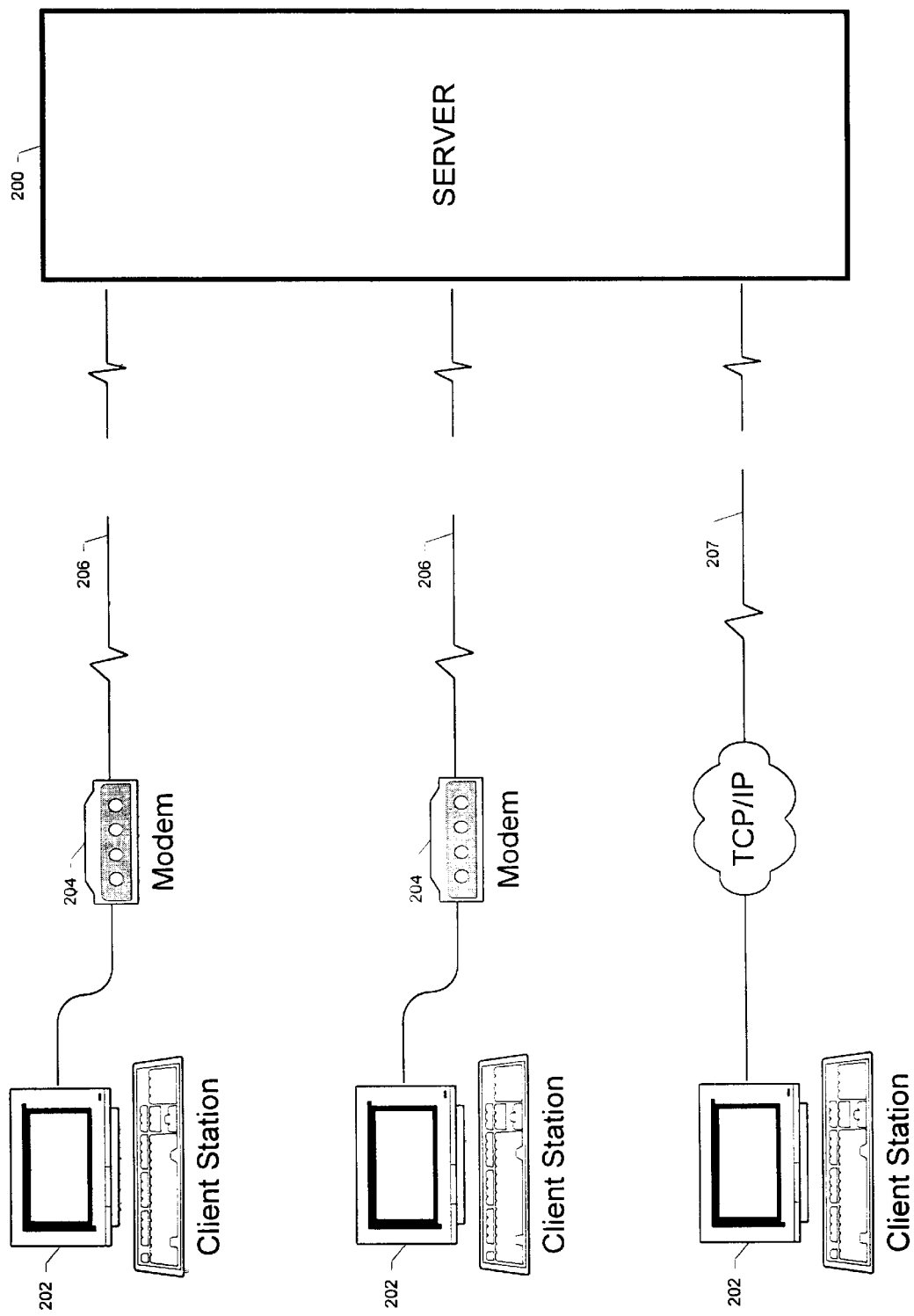
FIG. 2 shows a typical network computing environment.
Figure 3:
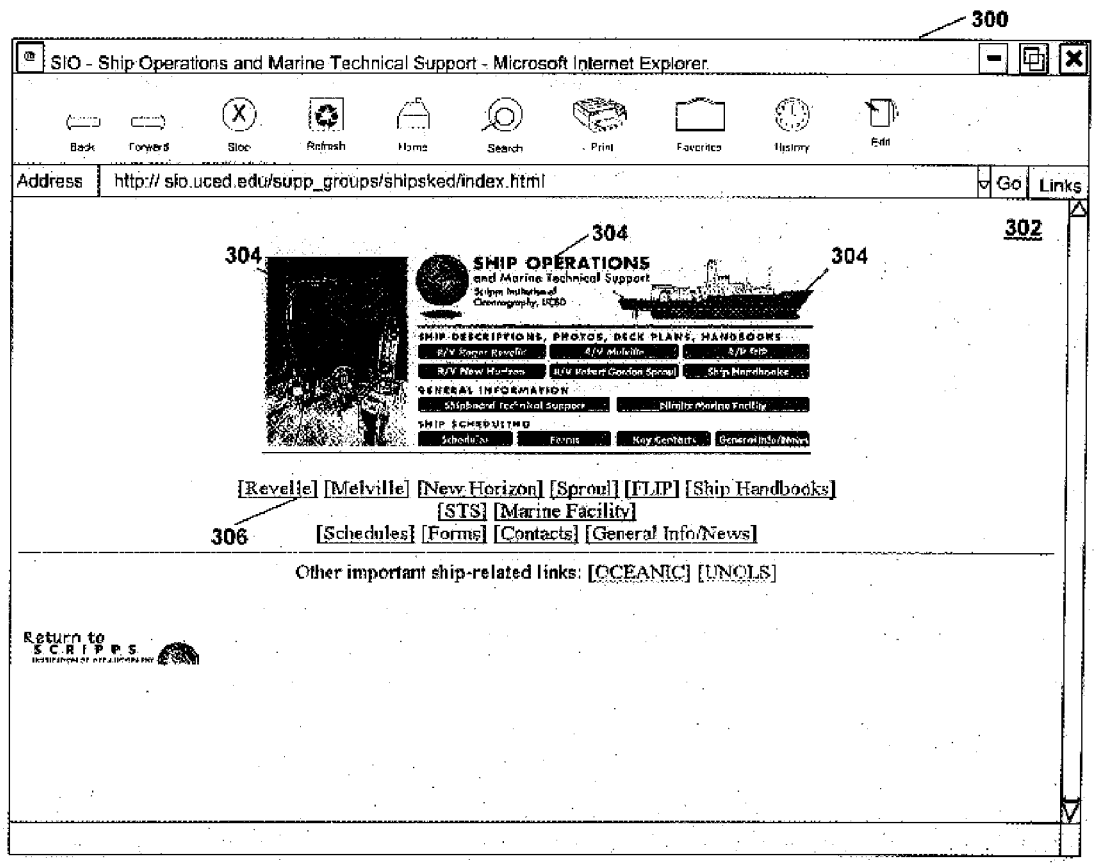
FIG. 3 shows a screen shot of a browser displaying a web page.
Figure 4:
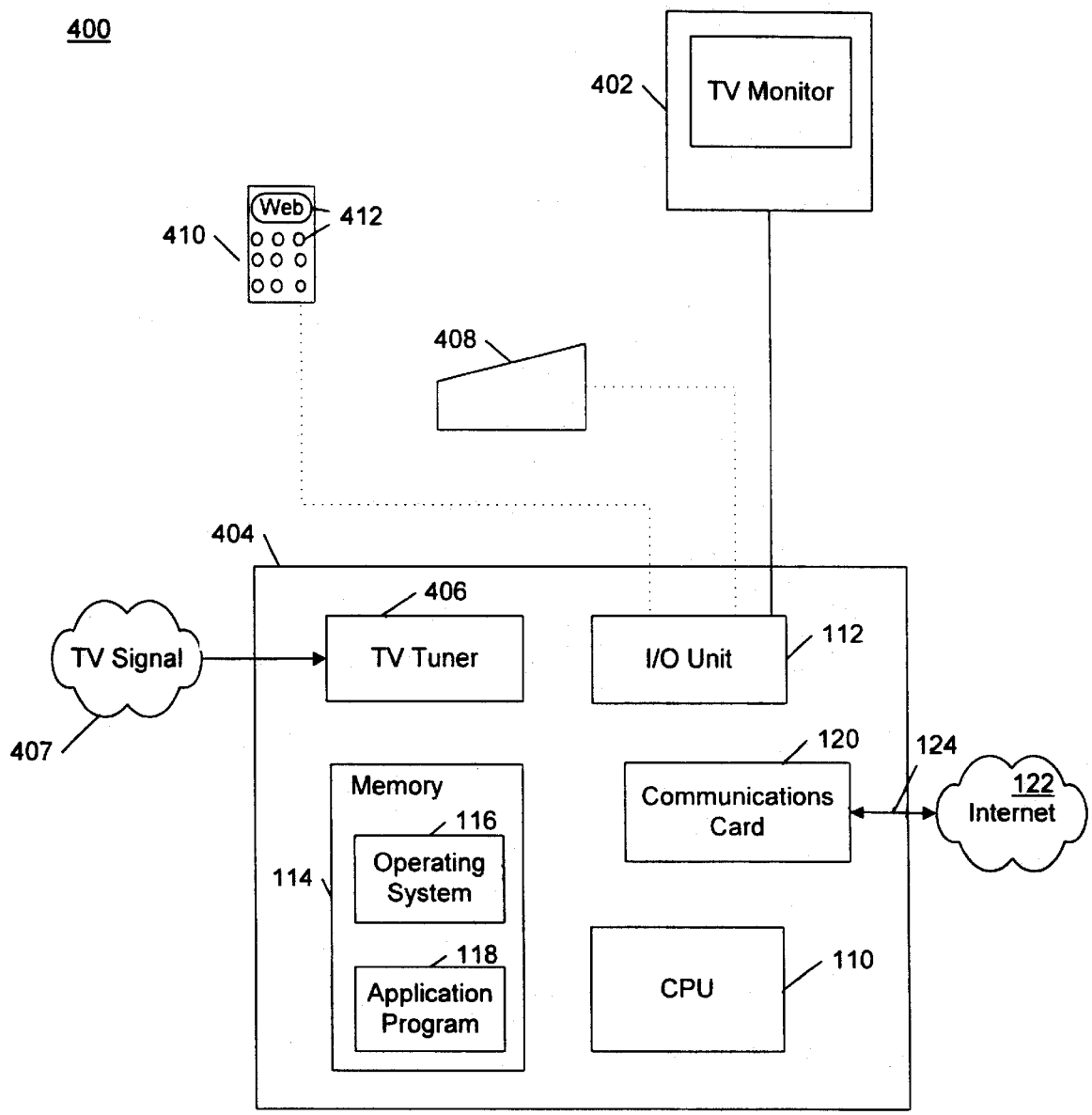
FIG. 4 is a block diagram of a web-based TV system.

Referring again to FIG. 7, the computer system 706 may be a typical hardware setup such as that shown in FIG. 1 or it may be a web-based TV system such as that shown in FIG. 4. Likewise, the computer system may be locally or remotely operated by a user. Therefore, the computer system 706 includes a general purpose computer 708 having a processor unit 710, an input/output (I/O) unit 712, and memory 714. The computer 708 includes a TV tuner 716 for receiving TV signals if the computer system 710 is configured as a web-based TV system. The computer system 706 communicates with a content provider 718 via a communications device 720 such as a modem or network adapter. The content provider 718 provides content to the user's computer system 706, which then presents the content using an output device 704 such as a monitor. The output device may display content in a content guide such as the electronic programming guide (EPG) described in FIG. 5.

Figure 12:
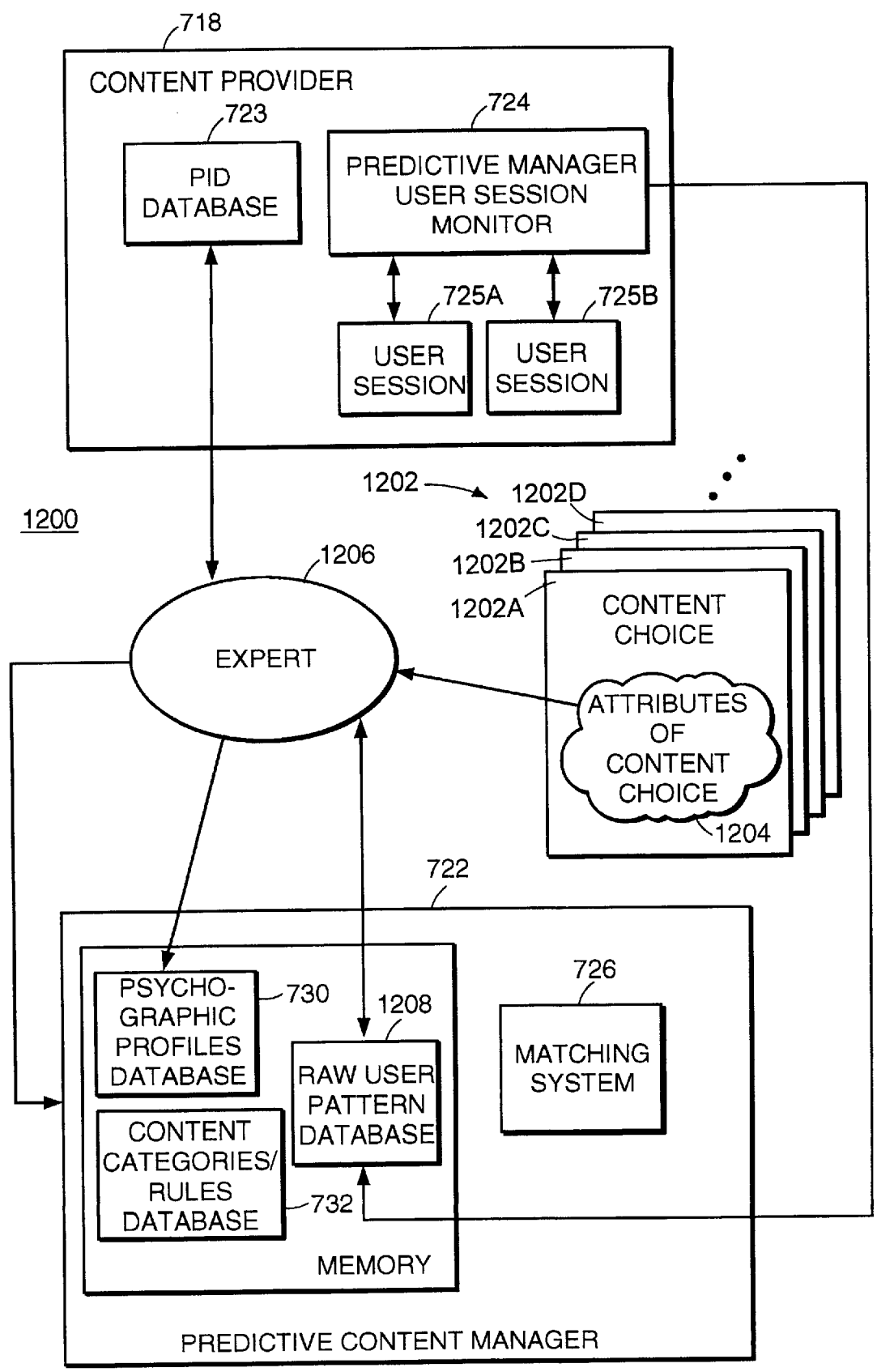
FIG. 12 is a block diagram of a predictive content system during a training stage.
Figure 14:
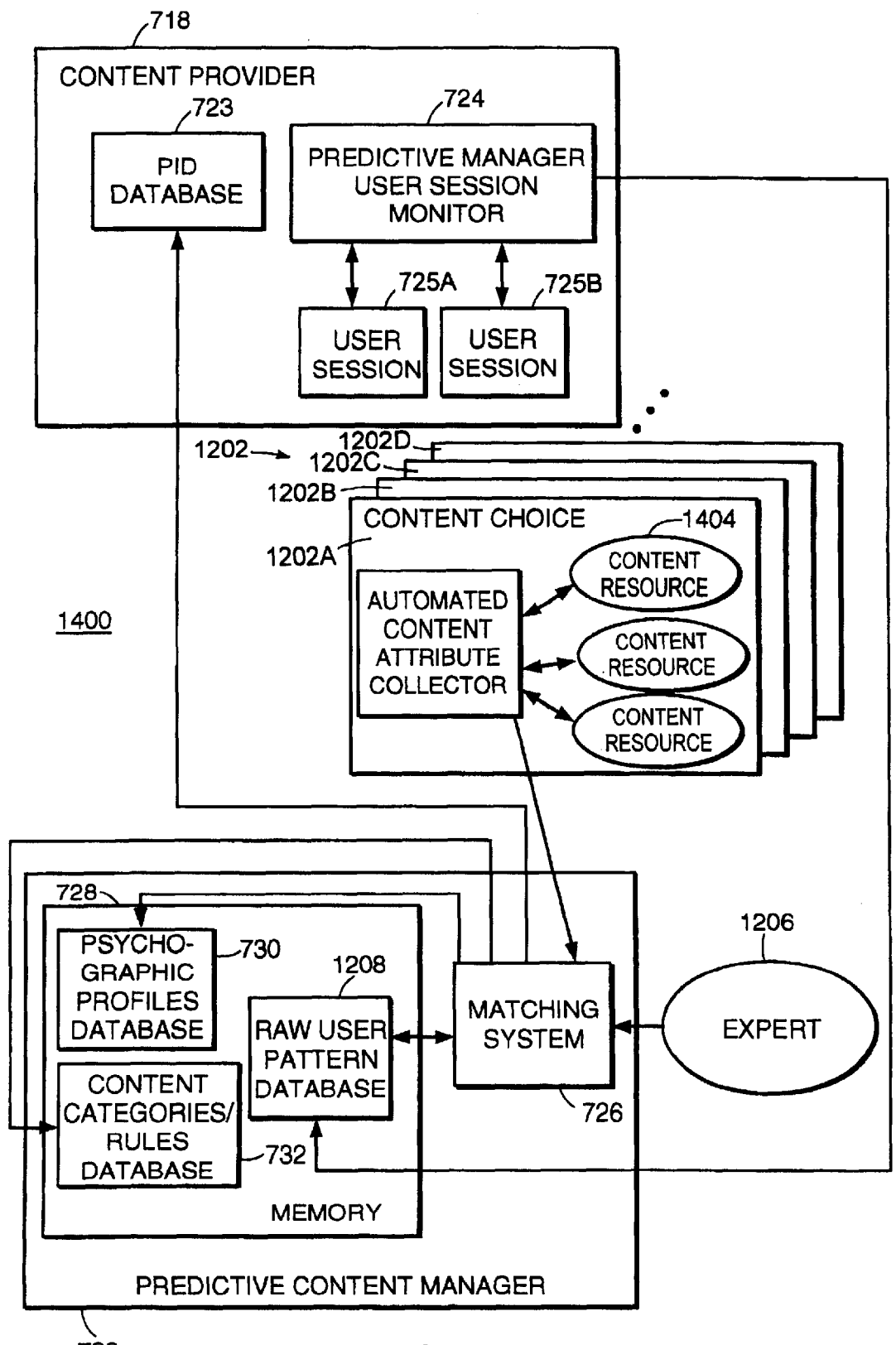
FIG. 14 is a block diagram of the predictive content system during a self-teaching stage.

The content provider 718 is linked to a predictive content manager 722 that may be implemented on a host computer to manage content that will be presented to the user. The content provider 718 includes a database 723 of PIDs. The content provider 718 also includes a monitor agent 724 controlled by the predictive content manager 722 to monitor user sessions 725 (or user sessions 725A and 725B as shown in FIGS. 12 and 14) on a network of different content choices. The monitor agent 724 sends information about user viewing and purchasing patterns in addition to other pertinent information (such as regional or temporal information) to the predictive content manager 722.

Based on the received raw data, a matching system 726 in the predictive content manager 722 stores psychographic profiles and content categories in addition to updating the PID database 723 at the content provider 718. The matching system 726 searches the content categories in the database 732 for those categories that best match preferences of a particular psychographic profile based on the rules in the database 732. The matching system 726 may be implemented in a processing unit for matching a psychographic profile to content categories using the rules 914. The predictive content manager 722 includes a memory 728 that stores, among other information, the user psychographic profiles in a psychographic profiles database 730 and the content categories and mapping rules in a content categories/rules database 732.

The predictive content system 700 preferably selects content choices using not only the procedure 800 described above, but also using other procedures that filter content—each procedure is therefore referred to as a filter. These filtering procedures are described below with respect to FIG. 10.

Figure 10:
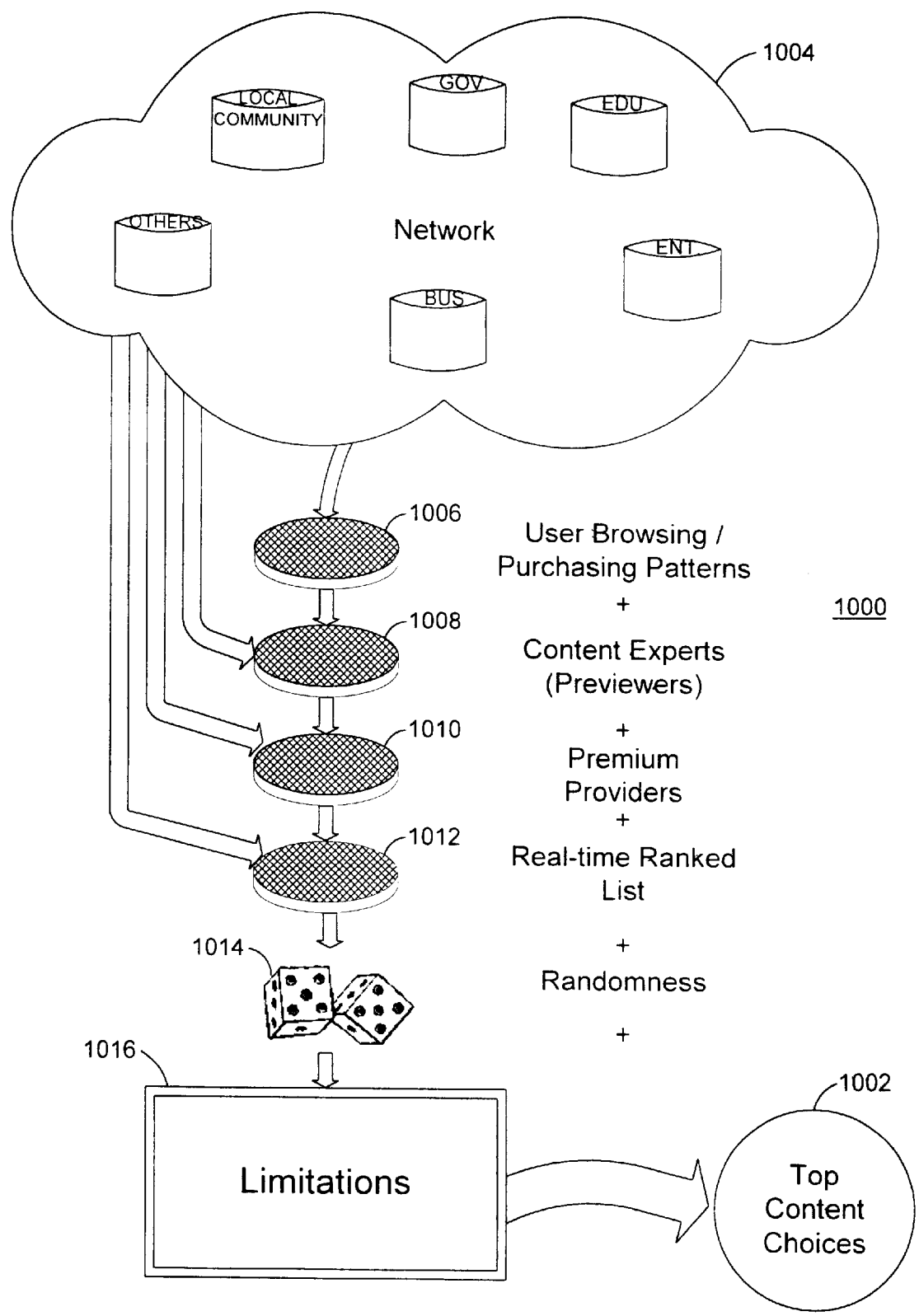
FIG. 10 is a chart of a procedure predicting future content choice user preferences.

FIG. 10 shows the process flow for a generalized procedure 1000 performed by the predictive content manager 722 to predict what content 1002 a user is likely to want. Content is provided by a network 1004 of content sources, for example, web pages on the Internet or TV channels from a cable TV provider. Each content source, in turn, may be controlled by a content provider. For example, content from the cable TV station ESPN (for example, the program "Sports Center") is controlled by the ESPN cable TV station, which in this example is the content provider.

The predictive content manager 722 may choose content based on any or all of a set of procedures that each filter content from the network 1004. For example, using procedure 800 detailed in FIG. 8, the predictive content system 700 filters content choices by selecting a best set of content choices for a user. The best set is based on that user's psychographic profile which is determined from the browsing and purchasing patterns of the user. In procedure 800, the predictive content manager 722 determines, for example, a user's patterns solely with respect to that user's past behavior and without regard to other users' behavior.

Alternatively, a particular user's patterns can be determined based on other users' behavior, for example, based on general popularity across the entire populace or based on behavior of users in certain demographic or affinity groups. Moreover, a user's patterns can be determined, in whole or in part, based on external events or conditions or other measurable criteria. For example, a user's patterns may be determined with respect to weather conditions, because, in theory, a user may be more likely to watch the weather channel during a thunder or snow storm.

As another example, a user's patterns may be determined with respect to the current time of year or month or day. For example, a user may be more likely to access CNN's web site during dinner time or early evening. User patterns also may be determined with respect to an area or region in which the user resides. For example, a user in Anchorage, Ak. may be more likely to purchase an off-road vehicle than a user in New York, N.Y. The criteria that can be used in determining a user's patterns are virtually limitless and depend in large part on the preferences and goals of the predictive system's designer. In any case, based on the user's browsing and purchasing patterns, the predictive content manager 722 filters (step 1006) a set of content choices from the network 1004.

The predictive content manager 722 also may select or filter content choices from the network 1004 based on "expert" choices (step 1008), for example, professional film critics' opinions, that are stored in memory 728 and obtained from the content provider 718. The predictive content manager 722 may further select content choices from the network 1004 by selecting a set of premium provider choices (step 1010). Premium provider choices include content from the currently most-recognized and respected content sources. For example, the predictive content manager 722 may select the Cable News Network TV station or corresponding web page at the URL www.cnn.com and present premium provider content from CNN to the user. The predictive content manager 722 also may select content choices from the network 1004 by selecting Real-Time ranked lists of content choices (step 1012). A Real-Time ranked list includes a top-n list of web sites deemed best or worst by a web site user, viewer, or developer. For example, Yahoo regularly lists top picks of web sites at the URL www.yahoo.com/new.

These filters 1006–1012 may be applied in parallel or in series (in any order deemed appropriate by the system developer). Moreover, the degree of filtering (that is, the number of content choices selected by a filter) may vary depending on the system design.

The predictive content manager 722 may become self-referential after an amount of time, that is, constantly presenting the same content to the user. Therefore, the user selects content from a potentially increasingly narrower set of content choices. In turn, the predictive content manager 722 can become stagnate, prevented from developing new content choices for the user. Because users are constantly seeking new information, an appropriate degree of randomness 812 is added to the content choice selection to prevent the above-described stagnation. The randomness 812 keeps the content fresh to the user while still maintaining a level of what the user wants.

In addition to the content filters and randomness added to the selection of content, the predictive content manager 722 must conform to limitations 1016 that influence how the predictive content manager 722 accesses, selects, and presents content. Limitations 1016 correspond to measurable parameters associated with the available content, for example, whether the amount of available content is relatively limited (such as on a basic cable TV system) or relatively abundant (such as on a web-based TV system). In such cases, the predictive content manager 722 may need to adjust its selection criteria based on the total amount of content available to the user.

Limitations 1016 alternatively may correspond to the amount of bandwidth available in the communications links across which information is transmitted. If only a narrow amount of bandwidth is available, the predictive content manager 722 can provide only a limited amount of content choices to the user. On the other hand, if, for example, digital transmission is used to permit a much broader bandwidth of information to be transmitted over standard communications links, a proportionately larger number of content choices can be presented to the user. An example of such a digital transmission technology is a Digital Subscriber Line (DSL) which enables data speeds from 164 Kbps up to 7.0 Mbps by transmitting digital data (in contrast to analog data) through telephone lines. In a web-based TV system using DSL or a similar digital communications service, the amount of available bandwidth, and thus the number of available channels, potentially would be unlimited. Therefore, if the predictive content manager 722 is used to help manage the presentation of content choices in a web-based or traditional TV system using digital transmission, the content manager 722 manages an extensive number of channels and potential viewing choices to display in the electronic programming guide.

Limitations 1016 also may relate to the amount of available real estate (that is, viewable area) on an output device such as a TV or computer monitor that displays content choices to the user. For example, a TV monitor has limited space for displaying available channel choices in the EPG. Therefore, the predictive content manager 722 limits or arranges accordingly the number of content choices that are presented to the user.

Limitations also may relate to limits on user focus or available time. The user may not focus on content because the user loses interest or finds something else to focus attention on. The user may get bored with the EPG or content display and decide that it is not dynamic enough. The user may have a finite amount of patience or focus for scrolling through pages of content choices to select one of interest. Likewise, the user may have only a limited amount of time (for example, a lunch break) for using the network 802. For example, because a web-based TV system using digital transmission technology potentially could provide a user with a very large number of content choices, the user could find it excessively time consuming to navigate through all or even a subset of the content choices. Because of this, the predictive content system 700 seeks to keep the user interested while also providing the user with content in a quick and efficient manner. The exact balance to be achieved among these competing policies (providing lots of choices, maintaining interest, maximizing time usage, etc.) depends on user preferences and/or the design objectives of the system implementer.

Figure 11A:
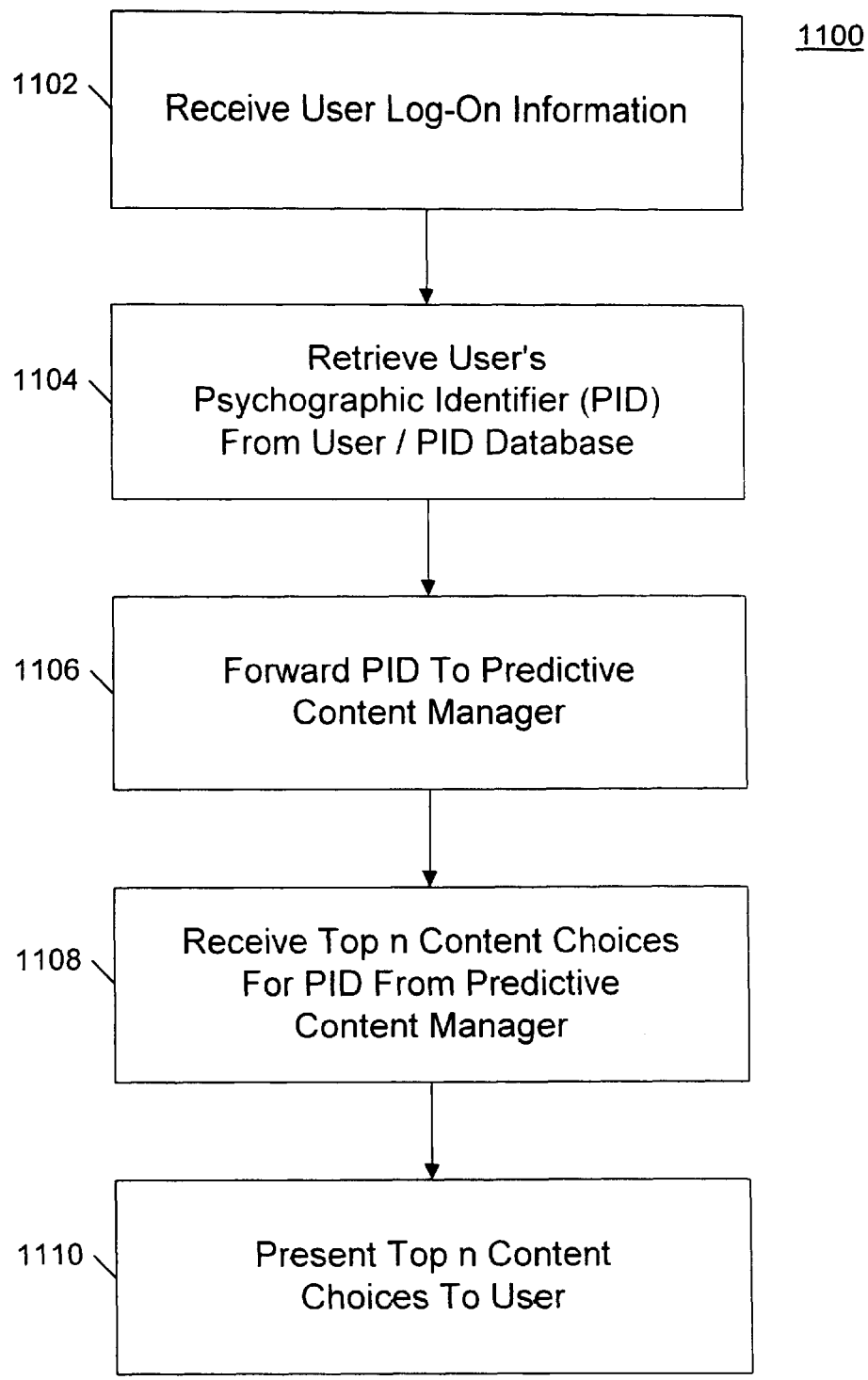
FIG. 11A is a flow chart of accessing and presenting user-preferred content choices.

FIG. 11A shows a procedure 1100 implemented by the content provider for accessing content choices from the predictive content manager and filtering those content choices to the user's computer system based on the psychographic profile/content category mapping described in procedure 800. Initially, the content provider receives user log-on information such as a user name and password (step 1102). This may require the user to enter the user name and password, or that information may be retrieved automatically whenever the user starts their computer system.

Next, the content provider retrieves the user's PID from the PID database (step 1104). The content provider provides the retrieved PID to the predictive content manager (step 1106) to solicit a selection of content choices. Then, the content provider receives a selection of top "n" (where n is a positive integer) content choices for the user's PID from the predictive content manager (step 1108). Lastly, the content provider presents the set of top n content choices to the user (step 1110). The user may select any one of the top n content choices using an input device such as a mouse or a remote controller. When the user selects a content choice, the content provider displays that content choice to the user. The content provider may create a personal content page for the user that displays the selected set of top n content choices. Then, when the user launches a browser, the user's personal content page can be displayed if the predictive content system has been enabled by the user.

During the procedure 1100, the predictive content manager is continually monitoring user sessions via the user session monitor at the content provider. Therefore, the user session monitor automatically stores information about a user's activities, for example, a user visit to a web site, a user bookmark of a web site, a user exiting a web site, a user purchasing a product, or a user history of content selections. The predictive content manager monitors user sessions to continually refine that user's psychographic profile, and therefore that user's PID.

The predictive content manager also may refine the user's psychographic pattern based on a more active solicitation of user information. For example, the predictive content manager may present the user with questions that will help in refining the user's psychographic pattern. If the predictive content manager does solicit information from the user, then it may also provide incentives to the user as a reward for information. Such active solicitation has both advantages and drawbacks. For example, active solicitation arguably gathers more accurate information about a user's likes and dislikes and does so more quickly than passive methods. But active solicitation of user input is potentially more invasive, and therefore undesirable for some users. The relative degrees to which active and passive data gathering should be used, or whether one should be used to the exclusion of the other, depends on the preferences and goals of the system designer.

Figure 11B:
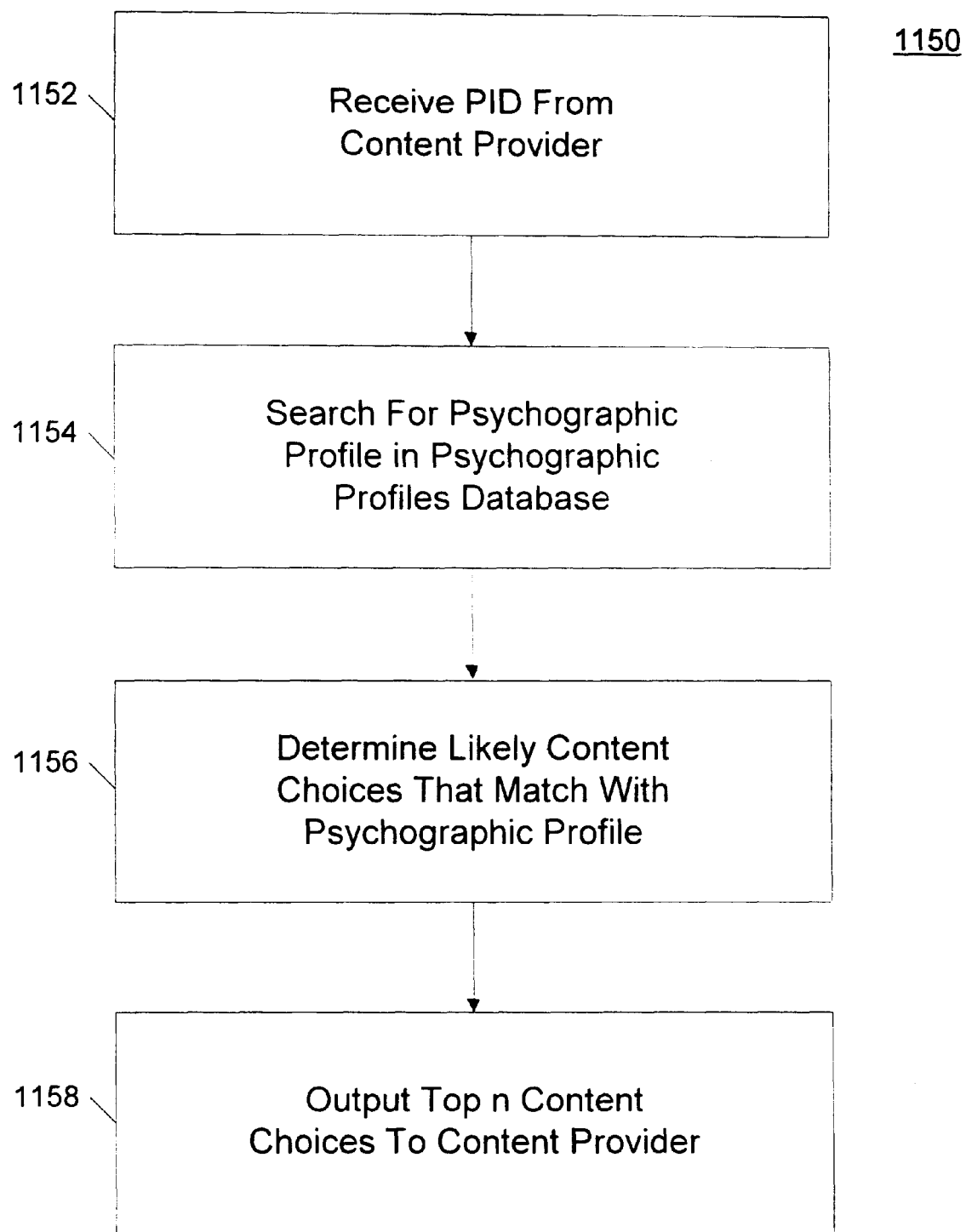
FIG. 11B is a flow chart of predicting user-preferred content choices.

After the content provider forwards the user's PID to the predictive content manager at step 1106 in the procedure 1100, the predictive content manager then performs a procedure 1150 shown in FIG. 11B for matching content choices with the user's PID. Initially, the predictive content manager receives the PID from the content provider (step 1152). Then, using the matching system, the predictive content manager searches for the PID's corresponding psychographic profile in the user attributes database (step 1154). Using the matching system, the predictive content manager searches the content categories/rules database for probability-weighted likely content maps or matches for preferences of the psychographic profile based on rules in the content categories/rules database (step 1156). A user psychographic profile/content categories mapping results in the conclusion that this particular user is likely to be interested in that particular content category. The various user psychographic/content categories mappings may be ranked by relevancy or probability such that only those mappings above a certain threshold are presented to the user. Based on the search, the predictive content manager outputs a set of top n content choices to the content provider (step 1158). This output may be, for example, in the form of a channel number or a URL address. In any case, the output is sufficient to completely identify each content choice.

In order to monitor user network sessions and categorize content, the predictive content manager accesses and classifies substantially all content choices. For example, if the network under consideration were the Internet, then web site owners may need to cooperate with the predictive content manager by providing descriptions of available content for the content manager to successfully classify content. Likewise, web sites may be classified by, for example, "web crawling". During web crawling, the predictive content manager visits various web sites and reads web site content and other relevant information in order to classify the web site. The predictive content manager could stealthily perform this web crawling so as not to influence response time for other users who access that web site. On the other hand, the predictive content system may charge content providers for inclusion in the system, and upon inclusion, the content providers would be expected to provide all necessary classification information.

In one implementation, the predictive content manager, when initially installed, is built manually. Then, after a certain amount of time, the predictive content manager is automatically and gradually refined. During a building stage 1200, the predictive content system may be represented by a block diagram shown in FIG. 12.

In the building stage 1200, a content choice 1202A is shown as a separate entity with corresponding attributes 1204. An expert 1206 such as a human links each component of the predictive content system, and based on the linkage, the expert 1206 eventually builds the predictive content system into a self-teaching entity. The expert 1206 generally links the content provider 718, the content choices 1202 and the predictive content manager 722. As shown, content choices 1202 includes content choices 1202A, 1202B, 1202C, and 1202D. The expert 1206 reviews raw user patterns to build psychographic profiles. Additionally, the expert 1206 browses content choices 1202 and selects attributes that are used by the expert 1206 to build content categories. Then, using the profiles and categories, the expert creates and refines the mapping from the profiles to the categories. During the building stage 1200, the expert 1206 accesses a raw user pattern database 1208, stored in, or accessible to, the predictive content manager. The raw user pattern database 1208 is a temporary database of raw user patterns that is constantly developing as the expert 1206 continues to build the predictive content system into a self-teaching entity.

Figure 13A:
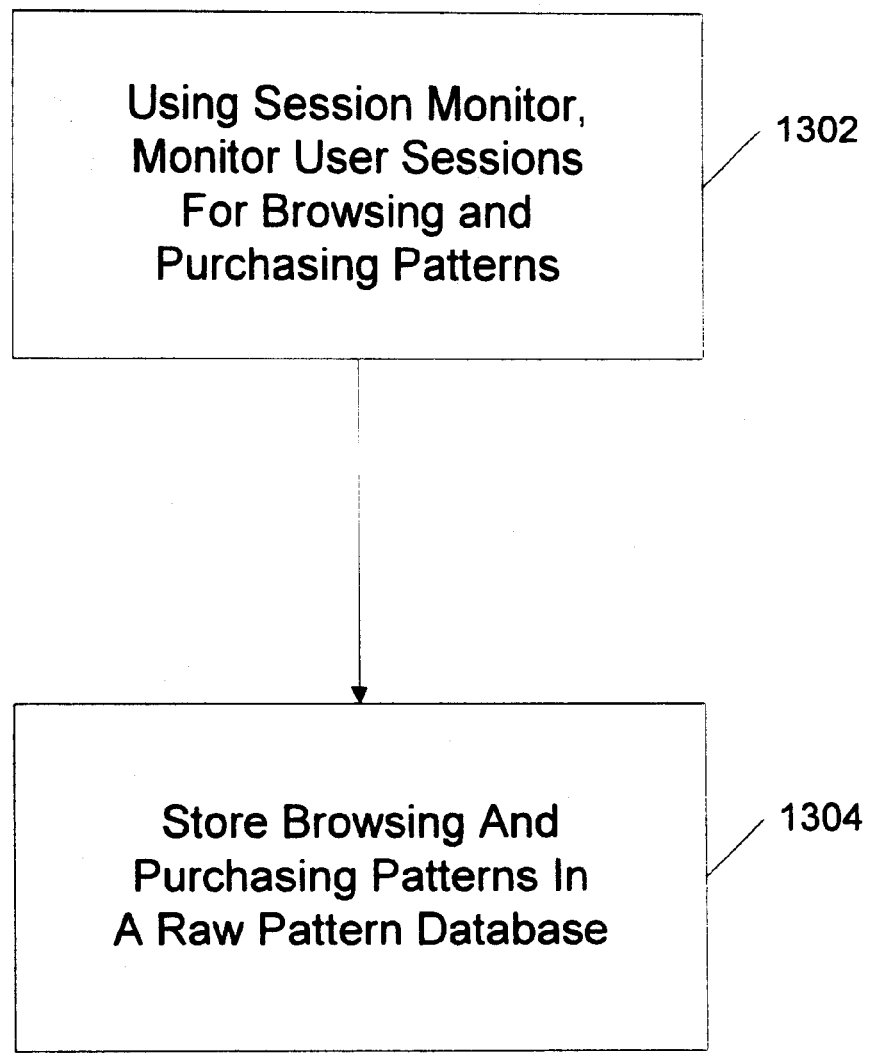
FIG. 13A is a flow chart of monitoring user sessions and finding user patterns during a training stage.

Referring also to a flow chart in FIG. 13A, during the building stage 1200, the predictive content manager continually performs a procedure 1300 for accessing and storing user pattern data. First, the predictive content manager monitors user sessions through the predictive manager user session monitor at the content provider (step 1302) and searches for user browsing and purchasing patterns. Then, the predictive content manager stores the user browsing and purchasing patterns in the raw pattern database 1208 (step 1304).

Figure 13B:
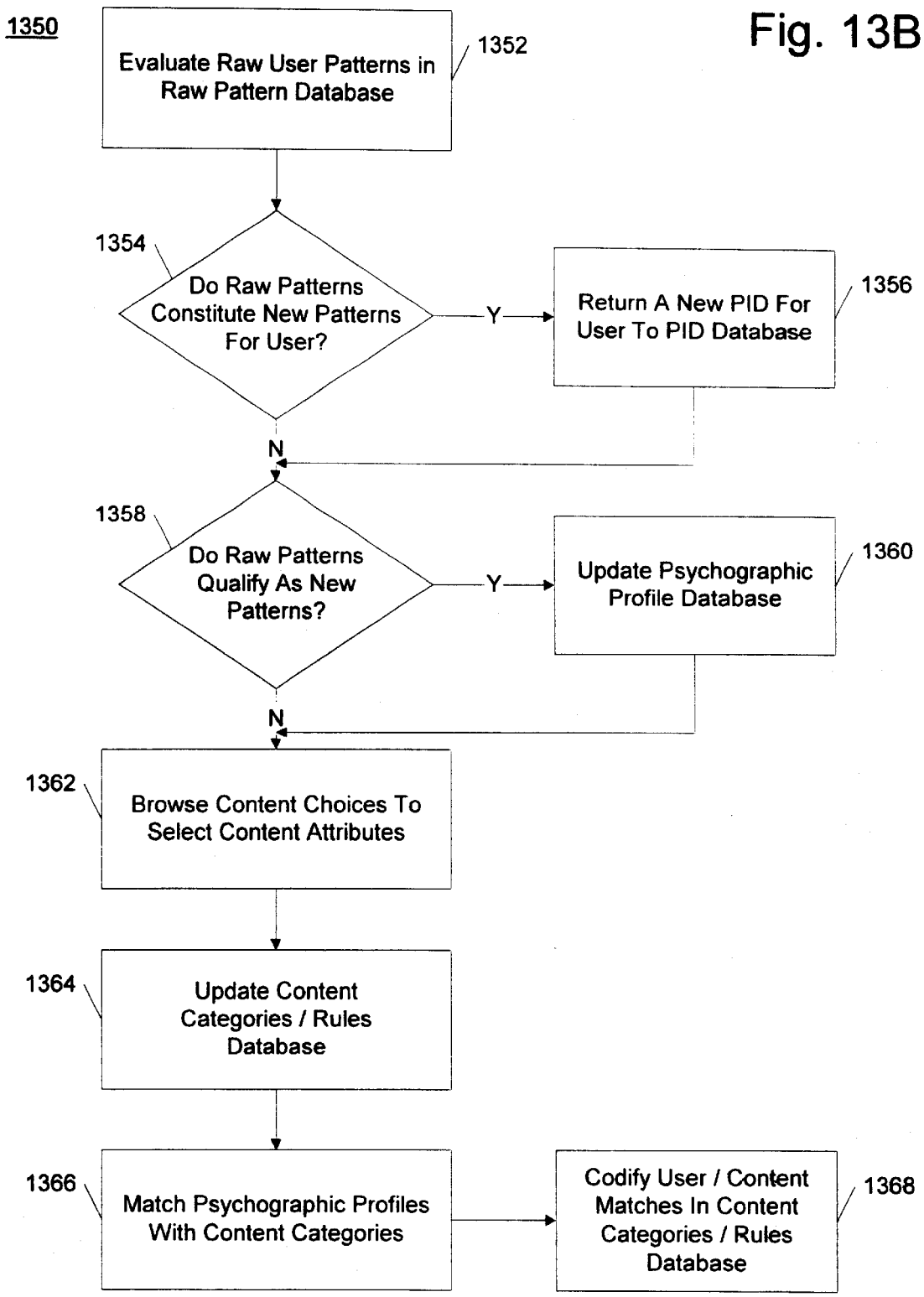
FIG. 13B is a flow chart of organizing user and content data during the training stage.

Referring also to FIG. 13B, the expert 1206 then performs a procedure 1350 for building the predictive content system 700. The expert 1206 first evaluates the raw user patterns in the raw pattern database 1208 (step 1352). The expert 1206 determines whether the raw user patterns constitute new patterns for the user (step 1354). If so, then the expert 1206 associates a new PID with the new user patterns and returns the new PID for the user to the PID database in the content provider 718 (step 1356). Then, the expert 1206 determines whether the raw user patterns qualify as new browsing/ purchasing patterns (step 1358). If so, the expert 1206 updates the psychographic profiles in the psychographic profiles database 730 (step 1360).

The expert 1206 then browses content choices 1202 in the network 1004 and identifies and categorizes information, experiences, products, and other resources available at those content choices 1202 (step 1362). Based on the identified categories for content, the expert 1206 updates the content categories/mapping database 732 (step 1364). The expert 1206 then determines which psychographic profiles (browsing and purchasing attribute combinations) correspond or map to which content categories (step 1366). After performing this mapping, the expert 1206 then codifies the psychographic profile/content category mappings into rules that are stored in the content categories/mapping database 732 (step 1368).

Soon into the procedure 1350, it potentially becomes overwhelming for human experts to keep up with increasing inflow of user data and content data. At this point, the predictive content system 700 is developed into a largely self-teaching system.

During development, the expert 1206 educates the matching system in the predictive content manager about the process of creating rules for the content categories/rules database. The expert does this by populating a meta-rules database within the matching system with meta-rules. Meta-rules dictate to the predictive content manager how to comb through changing streams of content and psychographic data to add new rules to or remove old rules from the content categories/rules database.

An example of a meta-rule follows:

IF a new content category emerges in the form of a new album by recording artist X, AND IF preference patters emerge showing that a majority of members of the psychographic profiles that include "likes ALL albums by recording artist X" also like the new album, THEN create and add the new rule:

IF the psychographic profile includes "likes recording artist X,"

THEN recommend the new album to members of that psychographic profile.

In the example above, the meta-rule uses preference patterns from among die-hard fans of the artist X in order to derive a rule to be used for members of a larger, less rabid fan-base. That is, a small highly-focused psychographic preference is used to codify an inference about a large group of psychographic profiles with a related but more vague preference.

Another example of a meta-rule might be one that limits the scope of the above-described meta-rule:

IF recommendations of new albums by recording artist X to certain psychographic profiles that include "likes recording artist X" result in a majority of cases in which members of that profile apparently do NOT like the new album, THEN stop recommending new albums by that artist to those psychographic profiles.

Therefore, once developed into a self-teaching system, the matching system acts as an inference engine that is capable of resolving multiple rules to determine which content should be recommended to which psychographic profiles.

Referring to a block diagram 1400 in FIG. 14, the self-teaching predictive content system 700 relies on an automated content attribute collector 1402 controlled by the predictive content manager 722 to collect data from each content resource 1404 that provides data to a content choice 1202A. For example, at any particular web page (content choice), data may be displayed from several different resources.

During the self-teaching stage, the predictive content manager 722 performs the procedure 1350 that the expert 1206 had performed during the building stage. Furthermore, the expert 1206 may still intervene during the self-teaching stage to fine tune decisions made by the predictive content manager 722 and to update the meta-rule database. During the self-teaching stage, the predictive content system 700 is capable of educating itself about increasing numbers and subtleties of user attributes and content attributes, and about rules that map the psychographic profiles to content categories using the meta-rules database. The predictive content system 700 can educate itself to virtually any level of precision and subtlety.

In one implementation, the predictive content manager 722 effectively acts as a neural network that searches for additional useful user patterns (step 1352) and content categories (step 1362), and forms new mappings (step 1368) based on new psychographic profiles and content categories. The predictive content manager 722 may use various techniques to manage all the data from these searches and to better make choices that a human would otherwise make. The data can be broken down into smaller parts or views that will yield more information. Therefore, the predictive content manager 722 analyzes the data for relationships that have not previously been discovered. For example, sales records for a particular brand of tennis racket might, if sufficiently analyzed and related to other market data, reveal a seasonal correlation with the purchase by the same buyers of golf equipment.

Based on the data analysis techniques, the predictive content manager 722 makes associations between events—for example, beer purchasers also buy peanuts a certain percentage of the time. The predictive content manager 722 also recognizes sequences of one event leading to another later event—for example, a rug purchase often is followed by a purchase of curtains.

Referring to a table 1500 shown in FIG. 15, relationships (called criteria 1502) between data may be used by the content manager 722 to group and analyze data and to develop new user and content patterns. These criteria may include a relevancy criterion 1504 that indicates whether the data is what the user is looking for directly. For example, data obtained from search engine results may be more relevant to what the user wants than data obtained by simply navigating through web sites without focus. The criteria may include a parallax criterion 1506 that determines if a different view of the same data exists. For example, a user watching "Sports Center" on ESPN cable TV station may obtain that same data in a different view at the Fox Sports web site.

The criteria also may include a registry criterion 1508 that indicates an object with which the data is affiliated. For example, data from Robert Ebert and the movies web site is affiliated with Buena Vista Television and remotely affiliated to Disney.com. Alternatively, a selection criterion 1510 indicating how data was collected, such as the data's origin, may be used. Thus, the data may come from a survey in which survey respondents volunteer information. On the other hand, the data may be gathered in a passive manner such as from a user's click stream (that is, the list of uniform resource locators (URLs) clicked on by the user during web surfing).

A criticism criterion 1512 indicates if another piece of data exists that is critical of the current data. For example, the Washington Times web site may post an article on tax reform that is quite critical of a similar article posted at the Washington Post web site. The criteria may include a construction criterion 1514 that indicates the structure of the data, for example, if the data is fragmented or secure.

A position criterion 1516 indicates a real time position of the user, for example, where the user presently is located and where the user is going. For example, a user at the Travelocity.com web site might be inclined to visit a travel guide web site or visit the Weather Channel station after leaving the Travelocity.com website.

Referring again to FIG. 14, with the help of the expert 1206, the predictive content manager 722 adds new psychographic profiles to its user psychographic profile database 730 and new content categories to its content categories/mapping database 732, enabling the creation of more unique profiles, categories, and rules.

The predictive content system 700 is a powerful self-teaching expert system that potentially, over time, could contain millions of unique psychographic IDs and unique content categories. Each PID could identify a kind or type of shopper/web surfer and could precisely match one or more content categories. The predictive content system 700 potentially could use thousands or even millions of rules for mapping psychographic profiles with content categories.

The predictive content system 700 may incorporate a recognizer (for example, implemented as an intelligent software agent) that determines a user's current PID when they hit a predictive content-enabled server. The recognizer may be associated with a separate predictive content helper application stored in memory 728 which, in addition to the user session monitor agent 724, causes the predictive content manager 722 to monitor the user's behavior.

The recognizer may exist within an applet implemented at a content provider's site that asks the user's permission to store and update the user's PID on the content provider's computer system 706. An application also may exist at the content provider's site for monitoring users' behavior.

The recognizer may exist within an applet, implemented at the content provider's site, that calculates a user's likely PID by sniffing out the configuration of that user's computer system 706 and the structure of the memory's first N (where N is high enough to uniquely identify the computer system) hierarchical levels. The configuration and structure of hierarchical storage is an industry-accepted method of economical and user-transparent backup and storage. Thus, the recognizer applet may associate a unique machine (computer) ID with the user. The predictive content manager 722 may therefore maintain a user-transparent database of machine IDs that are likely to correspond to psychographic IDs.

In any case, the predictive content system 700 works by knowing each user's psychographic (or machine) ID, and constantly monitoring user behavior to update their PID.

The techniques, methods and systems described here may find applicability in any computing or processing environment in which electronic content may be viewed, accessed or otherwise manipulated. For instance, the concept of a predictive content manager could be applied whenever it is desirable to manage a large amount of content and filter that content to present to a user. The predictive content system may be applied outside of a web-based TV environment— for example, internet alone, traditional TV alone, or in consumer electronics devices (such as a 500 disc CD player).

The predictive content system may be used to configure routers on the Internet that determine best routes for sending data across networks. The predictive content system also may be used in an operating system for organizing a user's desktop.

The predictive content system may be used in conjunction with other data techniques, such as delivering advertisements of goods. For example, an advertisement may be specifically directed to a particular user's psychographic profile. Likewise, the predictive content system may be used to filter search engine results, or for finding messaging and chat room partners based on a user's psychocraphic profile.

Various implementations of the systems and techniques described here may be realized in digital electronic circuitry, or in computer hardware, firmware, software, or in combinations thereof. A system or other apparatus that uses one or more of the techniques and methods described here may be implemented as a computer-readable storage medium, configured with a computer program, where the storage medium so configured causes a computer system to operate on input and/or generate output in a specific and predefined manner. Such a computer system may include one or more programmable processors that receive data and instructions from, and transmit data and instructions to, a data storage system, and suitable input and output devices.

Each computer program may be implemented in a high-level procedural or object-oriented programming language, or in assembly or machine language if desired; and in any case, the language may be a compiled or interpreted language. Suitable processors include, by way of example, both general and special purpose microprocessors.

Generally, a processor will receive instructions and data from a read-only memory and/or a random access memory. Storage devices suitable for tangibly embodying computer program instructions and data include all forms of non-volatile memory, including semiconductor memory devices, such as EPROM, EEPROM, and flash memory devices; magnetic disks such as internal hard disks and removable disks; magneto-optical disks; and CD-ROM disks.

Any of the foregoing may be supplemented by, or implemented in, specially-designed ASICs (application-specific integrated circuits).

A number of embodiments have been described. Nevertheless, it will be understood that various modifications may be made without departing from the spirit and scope of the invention. Accordingly, other embodiments are within the scope of the following claims.

What is claimed is:

1. A computer-implemented method of managing a user's content choices, the method comprising:

receiving an identifier associated with a user and indicating a psychographic profile for a group of multiple users;

searching a profile database to access the psychographic profile indicated by the identifier;

predicting one or more content choices that are likely to be of interest to the user based on a relationship between the accessed psychographic profile and available content; and presenting the predicted content choices to the user.

2. The method of claim 1, in which the identifier is received from a content provider.

3. The method of claim 1, further comprising monitoring the user's activities and continually refining the associated psychographic profile based on the user's activities.

4. The method of claim 3, in which monitoring comprises monitoring one or more of a user's inputs, the inputs including keystrokes, mouse clicks, remote control button activations, or any combination thereof.

5. The method of claim 3, in which monitoring comprises detecting patterns in the user's inputs.

6. The method of claim 3, in which user activities comprise a user's visit to a content choice, a user's purchase of a product, or a user's history of content selections.

7. The method of claim 3, in which user activities comprise a user's response to one or more questions or prompts.

8. The method of claim 1, in which the psychographic profile is based on a user's behavior.

9. The method of claim 8, in which the user's behavior comprises browsing and purchasing patterns.

10. The method of claim 1, in which the psychographic profile is based on other users' behavior.

11. The method of claim 10, in which other users' behavior comprises demographic or affinity patterns of users.

12. The method of claim 1, in which the relationship is based on external conditions.

13. The method of claim 12, in which the external conditions comprise weather conditions, temporal conditions or user location conditions.

14. The method of claim 1, in which the relationship is based on expert choices.

15. The method of claim 1, in which the relationship is based on premium content provider choices.

16. The method of claim 1, in which the relationship is based on ranked lists of content choices.

17. The method of claim 1, in which predicting one or more content choices comprises randomly selecting one or more content choices.

18. The method of claim 1, in which the relationship is based on probability-weighted mappings from a psychographic profile to one or more categories of content.

19. The method of claim 18, in which a content category comprises a variety of experiences, resources, and capabilities of content choices that fall within one or more of the content categories.

20. The method of claim 18, in which content categorization comprises accessing and classifying a substantial plurality of content choices.

21. The method of claim 20, in which content categorization comprises analyzing data within content to determine relationships among content data.

22. A computer-implemented method of managing a user's content choices, the method comprising:

receiving an identifier associated with a user and indicating a psychographic profile for a group of multiple users;

searching a profile database to access the psychographic profile indicated by the identifier;

predicting one or more content choices that are likely to be of interest to the user based on a relationship between the accessed psychographic profile and available content, in which the relationship is based on probability-weighted mappings from a psychographic profile to one or more categories of content, in which content categorization comprises accessing and classifying a substantial plurality of content choices, in which content categorization comprises analyzing data within content to determine relationships among content data;

in which data relationships include:

relevancy that indicates whether the data is what the user is searching for, parallax that indicates a different view of the same data exists, registry that indicates an object with which the data is affiliated, selection that indicates how the data was collected, analysis that indicates if another piece of data exists that is critical of the current data, construction that indicates a structure of the data, and position that indicates a realtime position and direction of the user; and presenting the predicted content choices to the user.

23. The method of claim 1, further comprising determining a user's psychographic profile by determining a configuration of a user's computer system.

24. The method of claim 1, in which presenting the predicted content choices comprises outputting the content choices to a content provider.

25. The method of claim 24, in which outputting the content choices to the content provider comprises causing the content provider to display content choices in an electronic programming guide.

26. Software in a computer-readable medium comprising instructions for causing a computer system to perform the following operations:

receive an identifier associated with a user and indicating a psychographic profile for a group of multiple users;

search a profile database to access the psychographic profile indicated by the identifier;

predict one or more content choices that are likely to be of interest to the user based on a relationship between the accessed psychographic profile and available content; and present the predicted content choices to the user.

27. The method of claim 1 in which the content choices include audio.

28. The method of claim 27 in which the audio includes music.

29. The method of claim 1 in which the available content includes audio.

30. The method of claim 29 in which the audio includes music.

31. The software of claim 26 in which the content choices include audio.

32. The software of claim 31 in which the audio includes music.

33. The software of claim 26 in which the available content includes audio.

34. The software of claim 33 in which the audio includes music.

35. The method of claim 3 further comprising refining the psychographic profile based on the monitoring.

36. The method of claim 3 further comprising building a psychographic profile based on the monitoring.

37. The method of claim 5 further comprising encoding and storing the detected patterns.

38. The method of claim 5 in which detecting patterns further comprises detecting patterns in real time.

39. The method of claim 5 in which detecting patterns further comprises detecting patterns while the user is offline.

40. The method of claim 5 which detecting patterns comprises tagging one or more selected user inputs.

41. The method of claim 40 in which tagging comprises XML tagging.

42. The method of claim 40 in which tagging comprises buy-decision logging.

43. The method of claim 40 in which tagging comprises homepage tagging.

44. The method of claim 40 in which tagging comprises Favorites/Bookmark list tagging.

45. The method of claim 40 in which tagging comprises repeated-site-visit tagging.

46. The method of claim 40 in which tagging comprises recommendation tagging.

47. The method of claim 40 in which tagging comprises plug-in tagging.

48. A method comprising:

maintaining one or more user-independent psychographic profiles, each psychographic profile corresponding to user content preferences for a group of multiple users;

assigning an identifier to a psychographic profile;

associating the identifier with a first user;

associating the identifier with a second user;

predicting content choices for the first user based on the psychographic profile assigned to the identifier associated with the first user; and providing to the first user a personalized electronic programming guide listing the predicted content choices.

* * * * *